United States Patent
Tonami

(10) Patent No.: US 6,768,706 B1
(45) Date of Patent: Jul. 27, 2004

(54) FREQUENCY CONTROL APPARATUS AND DIGITAL SIGNAL REPRODUCING APPARATUS

(75) Inventor: Junichiro Tonami, Yokohama (JP)

(73) Assignee: Victor Company of Japan, LTD, Yokohama (JP)

( * ) Notice: Subject to any disclaimer, the term of this patent is extended or adjusted under 35 U.S.C. 154(b) by 0 days.

(21) Appl. No.: 09/427,079

(22) Filed: Oct. 26, 1999

(30) Foreign Application Priority Data

Oct. 28, 1998 (JP) ............................................. 10-306838
Oct. 30, 1998 (JP) ............................................. 10-309603

(51) Int. Cl.⁷ ................................................ G11B 5/09
(52) U.S. Cl. ................................. 369/47.25; 369/47.28
(58) Field of Search ......................... 369/47.15, 47.25, 369/47.28, 47.45, 59.1, 59.15, 59.17, 59.18, 59.19, 59.2, 124.1, 124.14, 124.15; 360/27, 51, 65, 67

(56) References Cited

U.S. PATENT DOCUMENTS

| | | |
|---|---|---|
| 4,466,089 A | 8/1984 | Wachi |
| 5,231,544 A | 7/1993 | Matsushige |
| 5,278,874 A | 1/1994 | Liu et al. |
| 5,614,870 A * | 3/1997 | Sauer et al. ............... 360/51 X |
| 5,818,655 A * | 10/1998 | Satoh et al. .................. 300/65 |
| 5,946,279 A * | 8/1999 | Okada et al. ............. 369/47.45 |

FOREIGN PATENT DOCUMENTS

| | | |
|---|---|---|
| EP | 0 272 938 | 6/1988 |
| EP | 0 427 228 | 5/1991 |
| EP | 0 606 478 | 7/1994 |
| EP | 0 779 623 | 6/1997 |

\* cited by examiner

*Primary Examiner*—Paul W. Huber
(74) *Attorney, Agent, or Firm*—Lowe Hauptman Gilman & Berner, LLP

(57) ABSTRACT

A plurality of cross detectors have predetermined threshold levels different from each other. Each cross detector increments a count value when the reproduced signal crosses over its threshold level and generates the accumulated count value as a cross count value. Upon the cross count value agreeing with a common reference value, each comparator sends the coincidence signal to an OR circuit. The OR circuit produces a reset pulse in response to a first-arriving coincidence signal. The reset pulse is supplied to each cross detector to reset the cross count values of all of cross detectors and is also supplied to a down counter to reset it. When the cross count value becomes a predetermined value, an error signal is produced based on a deviation of the bit clock count value relative to a proper value so as to correct the deviation. The frequency control is performed based on the produced error signal.

12 Claims, 18 Drawing Sheets

PRIOR ART

FREQUENCY CONTROL APPARATUS AND DIGITAL SIGNAL REPRODUCING APPARATUS

BACKGROUND OF THE INVENTION

The present invention relates to a frequency control apparatus, and more particularly to a frequency control apparatus which is capable of performing the pull-in operation for a reproduced signal from an optical disk.

Furthermore, the present invention relates to a digital signal playback or reproducing apparatus, and more particularly to a digital signal playback or reproducing apparatus which decodes a digital signal reproduced from a recording medium.

A recording medium, such as an optical disk, is capable of storing information in a highly densified manner. A reproducing or playback system for this kind of recording medium includes a phase-locked loop circuit (i.e., PLL circuit) to obtain the data from a reproduced signal at accurate time intervals in a phase-locked manner. However, the pull-in range of the PLL circuit is theoretically limited to a narrow range of ±5~6%. For actual signals, this range may be further reduced to ±3~5%. When the optical disk is used, the relative speed of the signal widely varies. Namely, the reproducing or playback speed is variable in a wide range from an ordinary speed to a high speed equivalent to 20 times the ordinary speed. Thus, to control the pull-in process, it is necessary to provide a frequency control apparatus in the PLL circuit.

Conventional frequency control apparatuses are roughly classified into three groups. A first conventional frequency control apparatus uses a sync signal interval. In this case, the sync signal includes a transitional length (i.e., length between adjacent transitions) pattern longer than a run length restriction of the data (as known in a DVD). The sync signal interval is detectable based on a detected longest transitional length. An EFM (eight to fourteen modulation) signal of a compact disk (CD) has a maximum transitional length appearing at a predetermined probability. Thus, it is possible to detect the maximum transitional length of the EFM signal. The interval of the sync signal or the maximum transitional length is countable by using a clock generated from a voltage-controlled oscillator. Based on the counted value, it is feasible to check whether or not the detected value is correct. However, the first conventional frequency control apparatus requires a relatively long time to complete the judgement as an error detecting cycle is equivalent to the interval of the sync signal.

A second conventional frequency control apparatus uses the maximum transitional length pattern itself to judge whether or not a correct zero-cross detection number is obtained at the maximum transitional period. The PLL circuit controls the pull-in process accurately up to the range of ±5~6%. However, the second conventional frequency control apparatus is the same as the first conventional frequency control apparatus in that a relatively long time is required to complete the judgement because of a long error detecting cycle equivalent to the sync signal interval.

Furthermore, a third conventional frequency control apparatus utilizes an average transitional length which is defined by a ratio of an average of transitional lengths to a master clock counter. FIG. 10 is a block diagram showing an example of the third conventional frequency control apparatus. A counter 1 counts a master clock supplied from an oscillator. A comparator 2 compares the count value sent from the counter 1 with a predetermined reference value 1. The reference value 1 is sufficiently longer than a maximum transitional length of a reproduced signal.

The comparator 2 produces a coincidence signal at predetermined intervals. The coincidence signal serves as a reset signal which is supplied to the counter 1 and a zero-cross detector 3. The zero-cross detector detects and makes a count of zero-cross every time the reproduced signal crosses a zero-level (threshold level) which is determined considering the reproduced signal.

The zero-cross detection detector outputs an accumulated count value as a cross count value. The cross count value is supplied to a subtracter 4. The subtracter 4 reduces a predetermined reference value 2 from the received cross count value. The reference value 2 represents the ideal number of transition calculated based on an average transitional length in relation to the length of the reference value 1. The difference signal produced from the subtracter 4 is supplied to an error judging circuit 5. The error judging circuit 5 produces an error signal corresponding to the inputted difference signal. The error signal is supplied to a loop filter in the PLL circuit which produces a clock for detecting the reproduced signal, thereby controlling its characteristics.

According to the third conventional frequency control apparatus, the zero-cross detector 3 is reset at predetermined intervals. The zero cross is detected at the predetermined intervals. This is effectively applied to a scrambled signal. The error judgement is feasible at the intervals shorter than the sync signal intervals. Thus, it becomes possible to realize a high-speed pull-in operation which is usable as a rough adjustment.

However, as the conventional frequency control apparatus shown in FIG. 10 performs the error judgement at the predetermined intervals of the absolute time, there is a possibility that the error judgement is useless when the rate of the reproduced signal is changed from the ordinary reproduced speed to a high-speed reproduced speed, or from one high-speed reproduced speed to another high-speed reproduced speed.

Furthermore, each of the above-described conventional frequency control apparatuses requires the conditions that the zero-cross threshold level (i.e., setting of the zero level) is ideal and the transitional length (i.e., zero cross) is correctly judged. However, a rewritable optical disk, such as magneto-optical disk or a phase change disk, or a write once or a read only optical disk produces a reproduced signal which is characterized in that a signal level reduces with increasing frequency as shown in FIG. 11. Thus, the reproduced signal has a waveform peak level varying in accordance with the signal frequency. Furthermore, the waveform becomes asymmetric in the up-and-down direction. On these media, the center level (i.e., zero level) varies largely. Especially, this tendency remarkably appears when the optical disk is used for high-density recording.

To solve this problem, an automatic threshold control (ATC) can be used to adjust the center level of the reproduced signal to an optimum zero level. However, the threshold level may be deviated during a converging process of the ATC or when the ATC is performed for a vertically asymmetric signal to equalize the zero level of the zero-cross detection to the center of a maximum amplitude of the signal.

For example, FIG. 12A shows a case where a reproduced signal al has a symmetric waveform in the up-and-down direction and the threshold level is set to an ideal level I. In this case, a correct decoding data a3 is obtained in synchronism with a bit clock a2. However, during the converging process of ATC, the threshold level deviates from the ideal position to a level II with respect to a reproduced signal by having a symmetric waveform in the up-and-down direction as shown in FIG. 12B. In this case, a decoding data b3 obtained in synchronism with a bit clock b2 differs from the correct decoding data a3.

Furthermore, FIG. 12C shows another case where a reproduced signal c1 has an asymmetric waveform in the up-and-down direction but the threshold level is set to an ideal level III. In this case, a correct decoding data c3 is obtained in synchronism with a bit clock c2. However, when the ATC is performed to equalize the threshold level to the center level IV of a maximum amplitude of an asymmetric reproduced signal d1, a decoding data d3 obtained in synchronism with a bit clock d2 differs from the correct data c3.

When the threshold level is deviated from the ideal position as shown in FIGS. 12B and 12D, it becomes impossible to correctly detect the inversion positions. The maximum transitional length involved in the sync signal cannot be accurately judged. As a result, the maximum transitional length is erroneously detected as a value longer than the correct value. Therefore, the above-described first and second conventional frequency control apparatuses may malfunction and, as a result, the convergence will be delayed.

Furthermore, in the above conditions shown in FIGS. 12B and 12D, the zero-cross count becomes an inaccurate value. According to the third conventional frequency control apparatus, the relative speed of the signal will be detected as an incorrect value which is lower than the correct value. This will force the PLL circuit to erroneously reduce the frequency of the bit clock produced from the voltage-controlled oscillator. The condition is further worsened. As a result, the convergence will be delayed.

Meanwhile, the digital signal is reproducible from the optical disk by using a playback or reproducing apparatus. The sensitivity of the optical disk may fluctuate. A semiconductor laser is subjected to aged deterioration. Thus, a recording signal waveform will fluctuate. The duty ratio of a reproduced signal will also fluctuate. It is therefore necessary to introduce the automatic threshold control (ATC) for adequately DC controlling the threshold level of a binary comparator of the reproduced signal or an automatic gain control (AGC) for controlling the amplitude of the reproduced signal to a constant value. Furthermore, a frequency control is feasible to adequately perform the pull-in operation of a phase-locked loop (PLL) circuit which obtains a bit clock from the reproduced signal.

According to the ATC, it is desirable to correctly set a threshold level to the center of the peak-to-peak value at a minimum transitional length (i.e., minimum run length), although it is practically difficult. Simply setting the threshold level to the mid level between the uppermost peak and the lowermost peak of the reproduced signal has been conventionally performed. It is also conventionally known to maintain the reproduced signal value to a constant level obtained at the preamble portion. Such conventional techniques encounter with the problem that an error margin becomes small with increasing densification of the digital signals stored in the optical disk. Especially, according to the optical disk, the center level of a reproduced signal tends to fluctuate. The reproduced signal has an asymmetric waveform in the up-and-down direction. Thus, the conventional ATC cannot adequately control the threshold level.

According to the AGC of a conventional digital signal reproducing apparatus, it is desirable to maintain the minimum transitional length to a constant level, although it is practically difficult. Simply maintaining the peak-to-peak value of the reproduced signal to a constant value has been conventionally performed. Hence, the conventional techniques encounter with the problem that an error margin becomes small with increasing densification of the digital signals stored in the optical disk. Especially, the minimum inversional transition is small in the level, and is therefore sensitively influenced by the intersymbol interference or the cross talk.

Furthermore, according to the frequency control of a conventional digital signal reproducing apparatus, it takes a long time to detect a frequency error. It is impossible to accurately perform the judgement before the ATC and the AGC converges. It takes a long time to converge the frequency control. According to the frequency control, an error judgement is performed based on the number of zero-cross of the reproduced signal within a predetermined time. However, the zero-crossing operation may not be accurately performed when the signal waveform is asymmetric in the up-and-down direction. In such a case, the zero-cross frequency will include an error. The error judgement is not accurately performed.

In this manner, the conventional digital signal reproducing apparatus basically performs the ATC, the AGC and the frequency control. However, these controls are mutually influenced. It is not guaranteed that the system always converges. It was necessary to adjust the loop characteristics. For this reason, the convergence time becomes long and the error rate is worsened when an irregular reproduced signal is received. In a worst case, the system will not converge.

SUMMARY OF THE INVENTION

In view of the foregoing problems, the present invention has an object to provide a frequency control apparatus which is capable of causing the PLL circuit to quickly accomplish the pull-in process so that the decoding data can be accurately obtained irrespective of the deviation of the threshold value.

The present invention has an object to provide a digital signal reproducing apparatus capable of quickly converging even when the reproduced signal is irregular.

Furthermore, the present invention has another object to provide a digital signal reproducing apparatus capable of properly performing the automatic threshold control, the automatic gain control, and the frequency control for the reproduced signal of a recording medium storing information in a highly densified manner.

To accomplish the above and other related objects, the present invention provides a first frequency control apparatus for controlling a pull-in process of a phase-locked loop circuit which outputs a signal for accurately obtaining the data from an inputted reproduced signal at predetermined time intervals in a phase-locked manner. The frequency control apparatus comprises n pieces of cross detectors having n pieces of threshold levels different from each other and smaller than a maximum amplitude of the inputted reproduced signal, wherein n is an integer equal to or larger than 3, each cross detector incrementing a count value in response to a change of the inputted reproduced signal across a threshold level of the each cross detector and outputting an accumulated count value as a cross count value. A counting means is provided for counting a bit clock.

A reset means is provided for comparing each of the cross count values outputted from the n pieces of cross detectors with a common reference value and producing a reset signal when one of the cross count values agrees with the common reference value to reset all of the n pieces of cross detectors and the counting means. And, an error judging circuit detects a deviation of a count value of the counting means relative to a proper value and produces an error signal based on a detected deviation. The error signal is supplied to a loop filter in the phase-locked loop circuit.

According to the first frequency control apparatus, the bit cross count value is checked when the cross count value becomes the common reference value, and the error signal is generated based on a deviation of the bit clock count value relative to the proper value. Thus, it becomes possible to produce the error signal in accordance with a signal rate of the reproduced signal. Furthermore, by using a plurality of threshold values, it becomes possible to realize a frequency control without relying on the ATC for the reproduced signal.

The present invention provides a second frequency control apparatus for controlling a pull-in process of a phase-locked loop circuit which outputs a signal for accurately obtaining the data from an inputted reproduced signal at predetermined time intervals in a phase-locked manner. The second frequency control apparatus comprises n pieces of cross detectors having n pieces of threshold levels different from each other and smaller than a maximum amplitude of the inputted reproduced signal, wherein n is an integer equal to or larger than 3. Each cross detector increments a count value in response to a change of the inputted reproduced signal across a threshold level of the each cross detector and outputs an accumulated count value as a cross count value. Each cross detector outputs a transitional timing signal. There are n pieces of transitional length detectors. Each transitional length detector detects a maximum length between adjacent transitions based on the transitional timing signal produced from a corresponding one of the n pieces of cross detectors. A reset means is provided for comparing each of the cross count values outputted from the n pieces of cross detectors with a common reference value and for producing a reset signal when one of the cross count values agrees with the common reference value to reset all of the n pieces of cross detectors and the transitional length detectors. A selecting means is provided for selecting a maximum transitional length (maximum length between adjacent transitions) detected by the transitional length detector which receives the cross count value agreeing with the common reference value from one of the n pieces of cross detectors. And, a comparing circuit detects a deviation of the maximum transitional length selected by the selecting means relative to a proper value, and produces an error signal based on a detected deviation, and further outputs the error signal to a loop filter in the phase-locked loop circuit.

It is preferable that the n pieces of threshold levels are equally spaced to provide same clearances between two adjacent threshold levels, and the clearances is smaller than an amplitude at a minimum transitional length of said inputted reproduced signal. According to this arrangement, one of the n pieces of threshold levels always shows a correct zero cross value.

It is also preferable that the common reference value is equivalent to a proper zero-cross count value averaged during a time interval sufficiently longer than each transitional length, and the counting means is for setting an initial value equivalent to a proper bit clock count value when the zero-cross count value becomes a predetermined value. The counting means includes a down counter which decrements the count value in response to each entry of the bit clock.

Furthermore, to accomplish the above-described object, another aspect of the present invention provides a first digital signal reproducing apparatus comprising a control means for performing at least one of a DC control and a gain control. The DC control is performed to control the DC level of an inputted reproduced signal or to control the threshold levels based on a DC error signal. The gain control is performed to control the amplitude of the inputted reproduced signal or to control the threshold clearances (i.e., clearances between threshold levels) based on a gain error signal. A cross detecting section has three or more threshold levels different from each other and smaller than a maximum amplitude of the reproduced signal obtained from the control means. The cross detecting section increments a count value for each threshold level in response to a change of the reproduced signal across the each threshold level, and clears all of count values when the count value of any threshold level reaches a preset value. And, the cross detecting section restarts the increment operation of the count value for each threshold level in response to the change of the reproduced signal across the each threshold level. A phase-locked loop circuit generates a bit clock. And, an error detecting section generates at least one of the DC error signal and the gain error signal based on a relative relationship between the count values of the threshold levels at the time the count value of any threshold level reaches the preset value.

The error detecting section of the first digital signal reproducing apparatus generates the DC error signal so as to shift the DC level of the reproduced signal toward a threshold level corresponding to a smallest count value among the count values. And, the error detecting section is responsive to a first count value corresponding to a central threshold level and, when the first count value reaches the preset value, compares each of second count values other than the first count value with a predetermined value which is smaller than the first count value. The error detecting section generates the gain error signal to increase the gain in a case where the second count values are smaller than the predetermined value and to decrease the gain in a case where the second count values are larger than the predetermined value and smaller than the first count value.

It is preferable that the error detecting section further generates a frequency error signal for controlling a pull-in process in the phase-locked loop circuit based on a detected deviation of a bit clock count value relative to a proper value at the time the count value of any threshold level reaches the preset value.

Furthermore, to accomplish the above-described object, the present invention provides a second digital signal reproducing apparatus comprising a control means and a cross detecting section identical with those of the above-described first digital signal reproducing apparatus. The second digital signal reproducing apparatus further comprises an equalizer for equalizing a waveform of the reproduced signal obtained from the control means. An error detecting section generates at least one of the DC error signal and the gain error signal based on a relative relationship between the count values of the threshold levels at the time the count value of any threshold level reaches the preset value. A phase comparing means is provided for generating a phase error signal with respect to the reproduced signal outputted from the control means or a calculated signal derived from the reproduced signal. A loop filter receives the phase error signal. And, an oscillator receives an output signal of the loop filter as a control voltage and generates a bit clock.

The error detecting section of the second digital signal reproducing apparatus generates the DC error signal so as to shift the DC level of the reproduced signal toward a threshold level corresponding to a smallest count value among the count values. And, the error detecting section is responsive to a first count value corresponding to a central threshold level and, when the first count value reaches the preset value, compares each of second count values other than the first count value with a predetermined value which is smaller than the first count value. The error detecting section generates the gain error signal to increase the gain in a case where the second count values are smaller than the predetermined value and also to decrease the gain in a case where the second count values are larger than the predetermined value and smaller than the first count value.

It is preferable that the error detecting section further generates a frequency error signal for controlling the characteristics of the loop filter based on a detected deviation of a bit clock count value relative to a proper value at the time the count value of any threshold level reaches the preset value.

With this arrangement, the error detecting section commonly uses the cross count value of the cross detecting section for each of the ATC, the AGC and the frequency control. At least one of the DC error signal and the gain error signal, or the frequency error signal, is produced based on the relative relationship between the count values of the three or more threshold levels at the time the count value of any threshold level reaches the preset value. Hence, it becomes possible to perform at least one of the DC control (i.e., ATC) and the gain control (i.e., AGC) or the frequency control.

Moreover, the error detecting section does not produce the gain error signal when any one of the second count values reaches the preset value. This surely prevents the gain control from being erroneously performed due to undesirable drift of the DC level of the reproduced signal.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
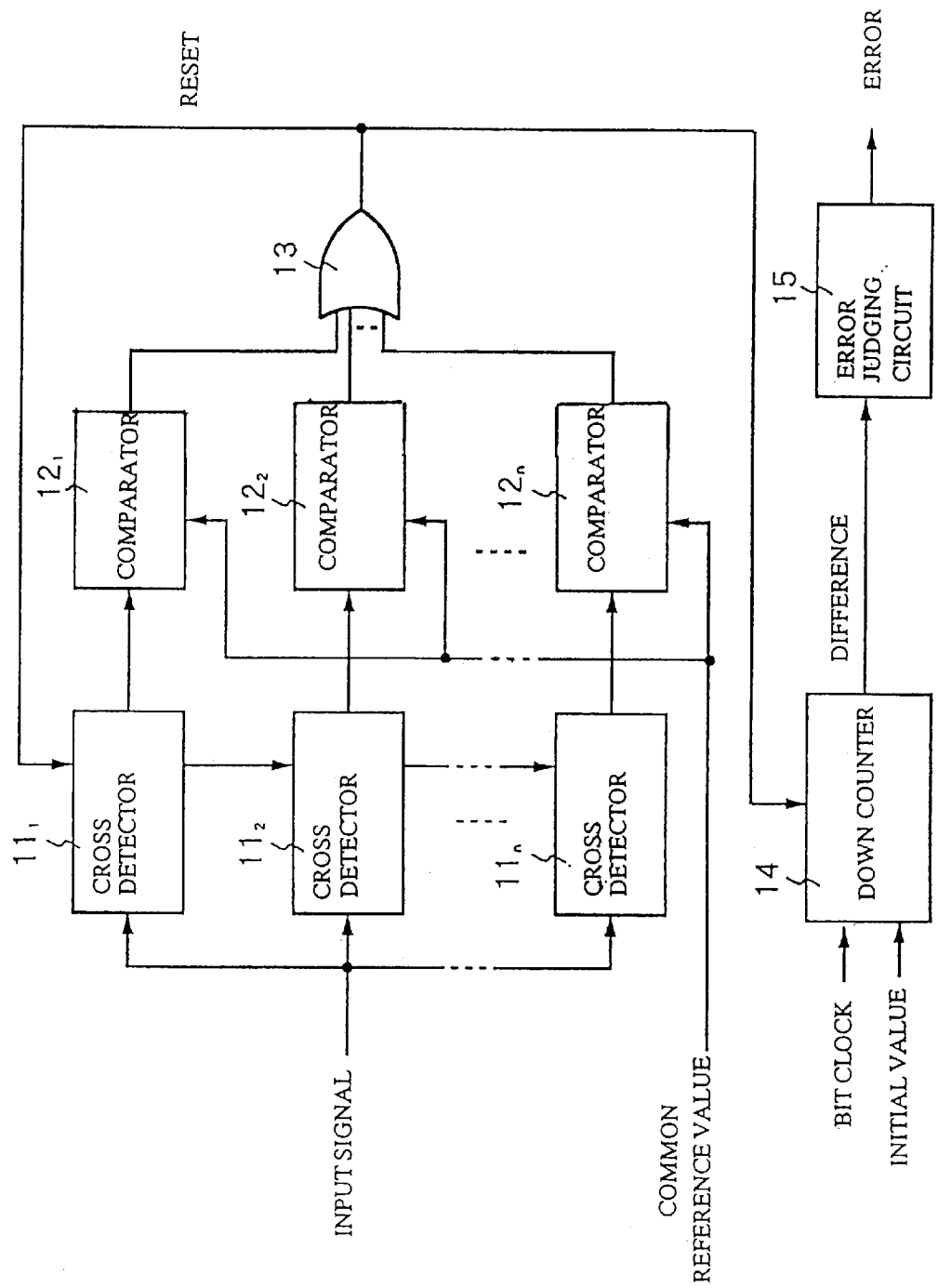
FIG. 1 is a systematic circuit diagram showing a frequency control apparatus in accordance with a preferred embodiment of the present invention.

Preferred embodiments of the present invention will be explained with reference to the accompanying drawings. Identical parts are denoted by the same reference numerals throughout the views.

FIG. 1 is a schematic block diagram showing a frequency control apparatus in accordance with one embodiment of the present invention.

A reproduced (or playback) signal of a recording medium, such as an optical disk (or optical disc), is supplied to a plurality of cross detectors $11_1$ to $11_n$, where n in an integer equal to or larger than three. The cross detectors $11_1$ to $11_n$ have threshold levels different from each other. Each cross detector $11_i$ (i=1, - - - , n) increments a count value in response to a change of the reproduced signal across its threshold level and generates the accumulated count value as a cross count value.

When the total number n of the cross detectors is 3, it is preferable to set a first threshold level as an intermediate level which is close to the proper center level of the reproduced signal. The clearance from the first threshold level to the remaining (i.e., second or third) threshold level should be smaller than the amplitude difference at a minimum inversional transition of the reproduced signal.

Figure 2:
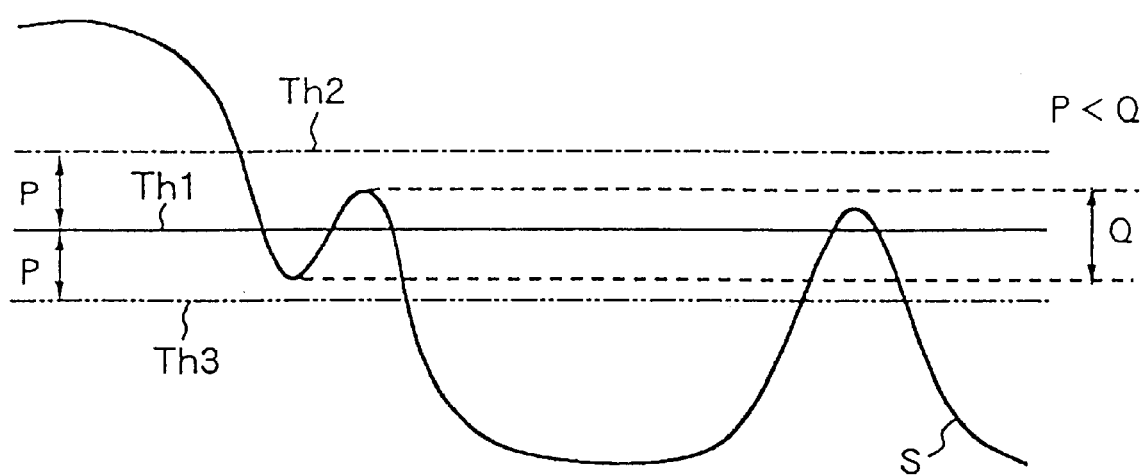
FIG. 2 is a view showing the relationship between a reproduced signal and three threshold levels shown in FIG. 1.

As shown in FIG. 2, the first threshold level Th1 is set as an intermediate level equivalent to the proper center level of the reproduced signal S. The second threshold level Th2 is higher than the first threshold level Th1. The third threshold level Th3 is lower than the first threshold level Th1. A same clearance P is provided between the first threshold level Th1 and each of second threshold level Th2 and third threshold level Th3. The variation or fluctuation of the reproduced signal S is represented by a curve with a minimum length between adjacent transitions having an amplitude difference Q. The clearance P is set to be smaller than the amplitude difference Q. By this setting, it is always assured that one of three thresholds Th1 to Th3 shows a correct zero-cross value (e.g., Th3 in the example of FIG. 2).

Returning to FIG. 1, the cross count value generated from each cross detector 11i (i=1, - - - , n) is supplied to an associated or paired comparator 12i (i=1, - - - , n). A common reference value is supplied to each comparator 12i. Each comparator 12i compares the cross count value received from the corresponding cross detector 11i with the common reference value. The common reference value is equal to the proper zero-cross count value averaged during a time interval sufficiently longer than each transitional length (i.e., each length between adjacent transitions). Each comparator 12i produces a coincidence signal having a high-level potential when the cross count value agrees with the common reference value.

Upon the cross count value agreeing with the common reference value, each comparator 12i sends the coincidence signal to an OR circuit 13. The OR circuit 13 produces a reset pulse in response to a first-arriving coincidence signal. The reset pulse is supplied to each cross detector 11i to reset the cross count values of all of cross detectors $11_1$ to $11_n$. The reset pulse is also supplied to a down counter 14 to reset the down counter 14. As described above, one of three threshold levels Th1 to Th3 gives the correct zero-cross value. It is thus believed that the cross count value first reaching the common reference value always includes the minimum transitional length. This is used to perform the error calculation.

The down counter 14 has a pre-loaded initial count value and decrements the count value in response to each input of a bit clock supplied from a voltage-controlled oscillator in a frequency control PLL circuit. Regarding the bit clock count value used for decoding the reproduced signal, the following relationship is established when a time interval is sufficiently longer than each transitional length.

(Bit clock count value)/(Cross count value)=(Average transitional length)

where "Cross count value" is a cross count value obtained when the inversion position is correctly judged, and "Average transitional length" is an average transitional length of the reproduced signal which is run length limited and also is scramble recorded.

When the cross count value becomes a predetermined value, a deviation of the bit clock count value relative to a proper value is checked. An error signal is produced to eliminate this deviation. The frequency control is thus feasible. According to this embodiment, when the cross count value becomes a predetermined value, an initial value equivalent to the proper bit clock count value is set in the down counter 14. When one of the cross count values becomes equal to the common reference value, a deviation of the bit clock count value relative to the proper value is produced from the down counter 14. The deviation value is supplied to an error judging circuit 15. The error judging circuit 15 generates an error signal having a value (e.g., +1, 0, -1) corresponding to the deviation value and its polarity. An output cycle of this error signal is referred to an error output cycle.

Figure 3:
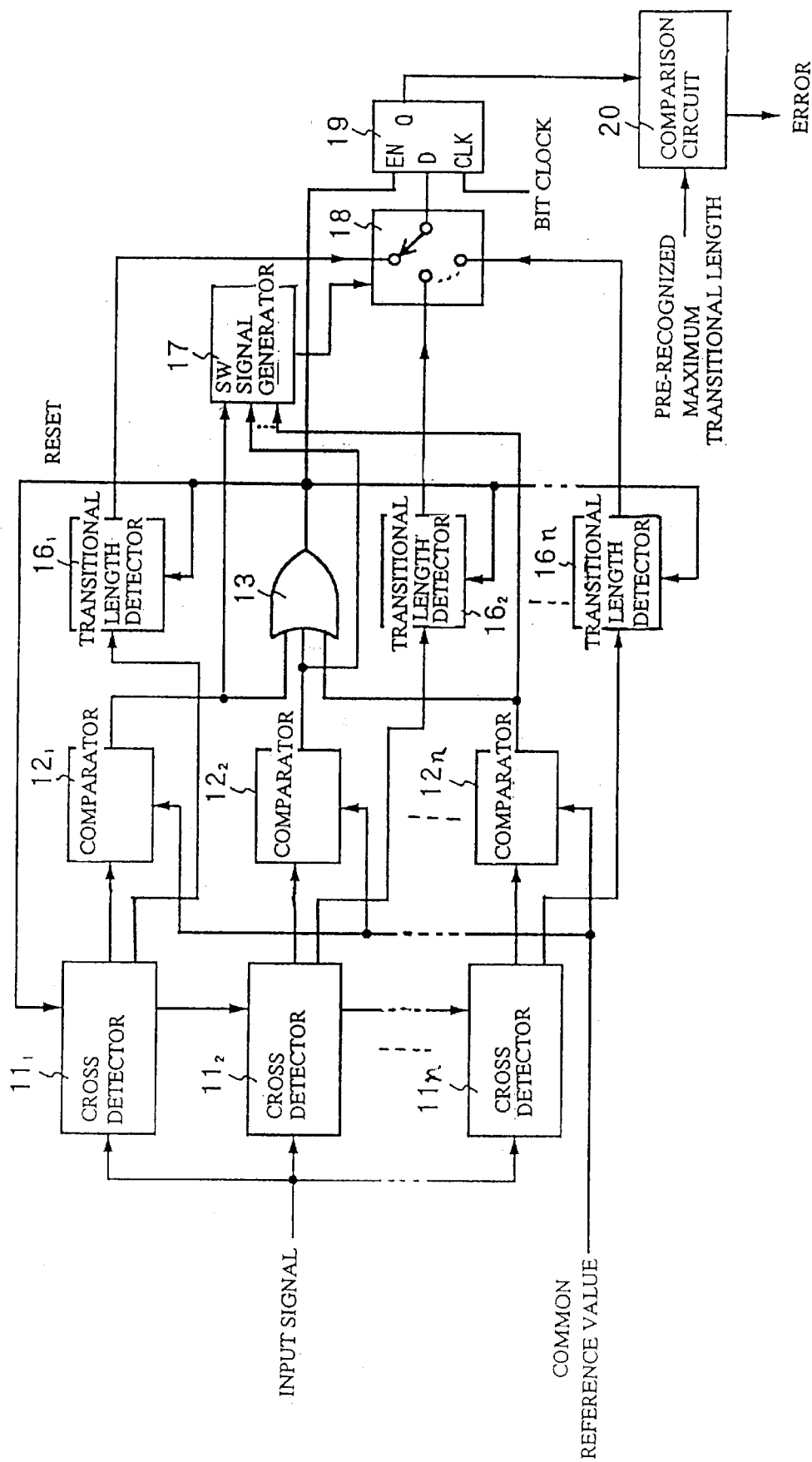
FIG. 3 is a systematic circuit diagram showing a frequency control apparatus in accordance with another preferred embodiment of the present invention.

Next, a different frequency control apparatus will be explained in accordance with another embodiment of the present invention. FIG. 3 shows a systematic circuit diagram showing a frequency control apparatus in accordance with another preferred embodiment of the present invention. In this case, the input signal is a sampling data signal which is in synchronism with the bit clock. In FIG. 3, the components identical with those disclosed in FIG. 1 are denoted by the same reference numerals and will not be explained. Each cross detector outputs a transitional timing signal. The transitional timing signals produced from the cross detectors $11_1$ to $11_n$ are supplied to the transitional length detectors $16_1$ to $16_n$, respectively. Each transitional length detector 11i (i=1, 2, - - - , n) detects a maximum transitional length (i.e., maximum length between adjacent transitions) and sends it to a switch circuit 18.

Meanwhile, the output signal of each comparator 12i (i=1, 2, - - - , n) is supplied to a switching signal generator 17 in which the inputted signal is converted into a switching signal. The switching signal is supplied to the switch circuit 18. When a comparator receives a cross count value that agrees with the common reference value earlier than other comparators, the switch circuit 18 is controlled to select an output signal of the transitional length detector which receives the transitional timing signal outputted from the cross detector whose cross count value agrees with the common reference value. The transitional length signal selected by the switch circuit 18 is supplied to a data input terminal of a D flip-flop circuit 19. The inputted signal is latched in synchronism with a bit clock, and then supplied to a comparison circuit 20.

The comparison circuit 20 receives a pre-recognized maximum transitional length corresponding to the input signal. The comparison circuit 20 compares the maximum transitional length received from the flip-flop circuit 19 with the pre-recognized maximum transitional length. When the compared values agree with each other, no error signal is produced (i.e., an output signal of 0 is produced). When the compared values disagree, the comparison circuit 20 produces an error signal having a value corresponding to the difference between the compared values or a polarity of the difference (e.g., +1, -1). For simplifying the drawing, only one flip-flop circuit 19 is shown in FIG. 3. It is however necessary to provide a plurality of flip-flop circuits 19 arranged in parallel with each other. An actually required number of the flip-flop circuits 19 is dependent on the bit number of the detected maximum transitional length. The reset pulse of the OR circuit 13 is supplied to each transitional length detectors 16i (i=1, 2, - - - , n) to reset all of transitional length detectors $16_1$ to $16_n$.

This embodiment is based on the following consideration. During a time interval until the cross count value reaches the common reference value, the maximum transitional length detected by the transitional length detectors 16i (i=1, 2, - - - , n) becomes equal to the pre-recognized maximum transitional length at least one time in a normal condition. Thus, a frequency error signal is produced by checking the difference between the detected maximum transitional length and the pre-recognized maximum transitional length. The frequency error signal is sent to the loop filter in the PLL circuit. The error calculation can be performed during this maximum inversional transition or during a continuous time period including this maximum transitional length, as long as the maximum transitional length is detectable.

Figure 4:
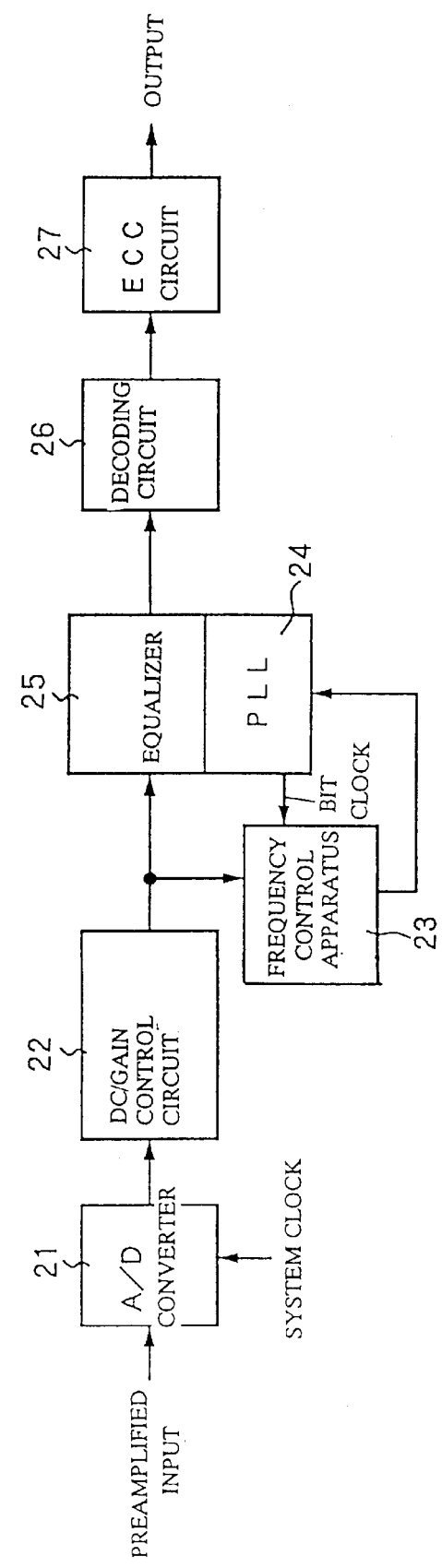
FIG. 4 is a block diagram showing an example of a recording medium playback or reproducing apparatus employing the frequency control apparatus in accordance with the present invention.

FIG. 4 is a block diagram showing an example of a recording medium playback or reproducing apparatus which is capable of performing the frequency control of the present invention. This recording medium playback or reproducing apparatus is operable in two ways. In a first case, the clock signal outputted from a VCO in the PLL circuit can be sampled as a system clock supplied to an A/D converter 21. In a second case, a fixed system clock is supplied to the A/D converter 21 and then the system clock is later interpolated in the PLL circuit. In FIG. 4, the reproduced signal from a recording medium, such as an optical disk, is pre-amplified through a preamplifier (not shown). The output of the preamplifier is converted from an analog signal to a digital signal in the A/D converter 21. A digital output signal of the A/D converter 21 is suppled to a DC/gain control circuit 22 wherein the inputted digital signal is subjected to a conventional DC control (i.e., ATC control) and a gain control (i.e., AGC). An output of the DC/gain control circuit 22 is supplied to a frequency control apparatus 23 of the present invention and also to an equalizer 25.

In addition to the digital reproduced signal, the frequency control apparatus 23 receives a bit clock from a PLL circuit 24. The frequency control apparatus 23 has the circuit arrangement shown in FIG. 1 and sends the error signal to the loop filter in the PLL circuit 24. The equalizer 25 performs the equalizing processing of the reproduced signal based on the output signal of the PLL circuit 24. An output signal of the equalizer 25 is supplied to a decoding circuit 26. The decoding circuit 26 decodes the inputted digital signal and sends the decoded result to an ECC circuit 27. The ECC circuit 27 performs an error-correcting operation by using an error-correcting code and finally produces the reproduced data.

Figure 5:
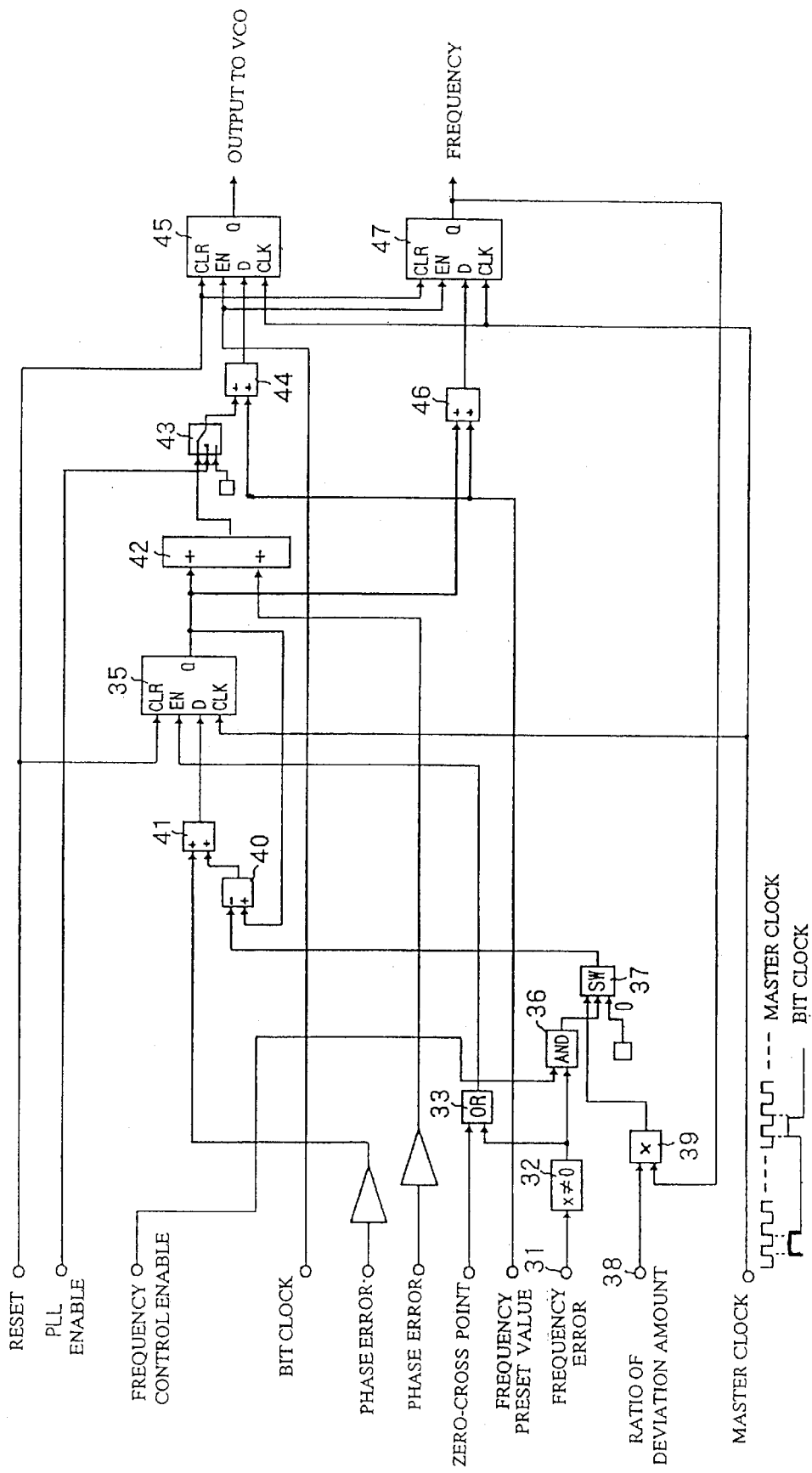
FIG. 5 is a circuit diagram showing an example of a phase-locked loop circuit which receives the error signal of the frequency control apparatus in accordance with a preferred embodiment of the present invention.

Next, an essential arrangement of the PLL circuit 24 is explained. FIG. 5 is a circuit diagram showing an example of the PLL circuit 24 into which the error signal of the frequency control apparatus 23 is inputted. The error signal produced from the frequency control apparatus 23 is supplied to a computing element 32 via a terminal 31. Except for the case where there is no frequency error, the inputted error signal is converted into a high-level signal and is then supplied to an enable terminal of a D flip-flop circuit 35 via an OR circuit 33. In response to this signal, the D flip-flop circuit 35 is activated. The output signal of the computing element 32 is also supplied to an AND circuit 36. The AND circuit 36 receives a frequency control enable signal in addition to the output signal of the computing element 32, and produces an AND result of these input signals.

A terminal 38 receives a signal representing a ratio of the deviation amount. This signal is multiplied with an output signal of a D flip-flop circuit 47 in a multiplier 39. The signal representing the ratio of the deviation amount is defined by a ratio of the count value of the down counter 14 to its target value, i.e., deviation initial value. A switch 37 selects an output signal of the multiplier 39 in response to a high-level signal inputted from the AND circuit 36. The switch 37 produces an output of 0 when a low-level signal is inputted from the AND circuit 36. A subtracter 40 subtracts the output signal of the switch 37 from an output signal of a D flip-flop circuit 35. An output of the subtracter 40 is supplied to an adder 41. The adder 41 adds the output of the subtracter 40 with a phase error signal supplied from a phase comparator in the PLL circuit. An output of the adder 41 is supplied to a data input terminal of the D flip-flop circuit 35. The D flip-flop circuit 35 latches a signal inputted from the data input terminal in synchronism with a master clock.

The subtracter 40, the adder 41 and the D flip-flop circuit 35 cooperatively work as a feedback group and integrate a frequency deviation amount. The output signal of the D flip-flop circuit 35 is supplied to an adder 42 and added with a phase error signal supplied from a phase comparator in the PLL circuit. An output signal of the adder 42 is supplied to an adder 44 via a switch 43, and is added with a frequency preset value. Then, an output signal of the adder 44 is supplied to a data input terminal of a D flip-flop circuit 45.

The D flip-flop circuit 45 latches a signal inputted from the data input terminal in synchronism with the master clock. The latch signal of the D flip-flop circuit 45 serves as an output signal of the loop filter which is supplied to a voltage-controlled oscillator (VCO) in the PLL circuit. Furthermore, the D flip-flop circuit 45 supplies its output signal to the VCO in synchronism with a bit clock inputted in its enable terminal. An adder 46 adds the output signal of the D flip-flop circuit 35 with the frequency preset value. The D flip-flop circuit 47 receives an output of the adder 46 and produces it in synchronism with the bit clock. The pulse width of the bit clock of FIG. 5 is equivalent to one complete cycle of the master clock.

Figure 6:
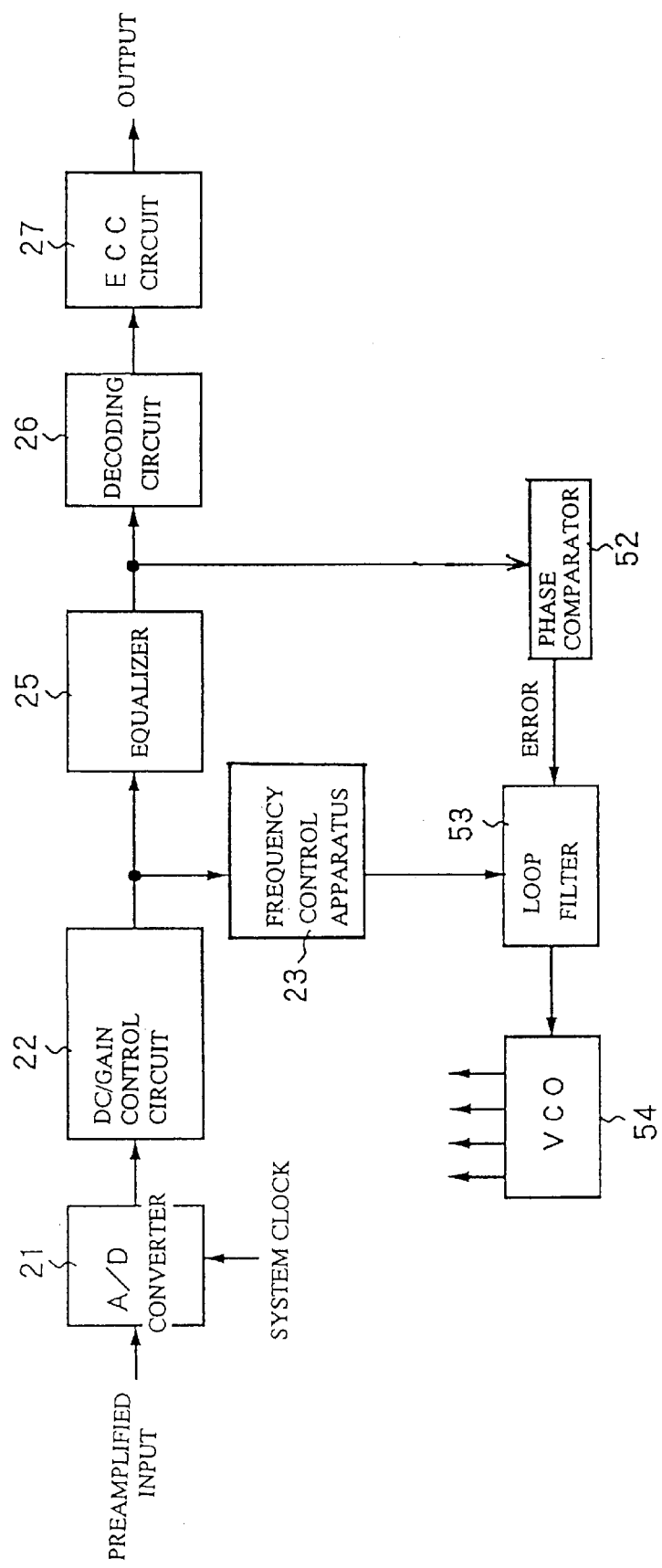
FIG. 6 is a block diagram showing another example of a recording medium playback or reproducing apparatus employing the frequency control apparatus in accordance with the present invention.

FIG. 6 is a block diagram showing another example of the recording medium playback or reproducing apparatus which is capable of performing the frequency control of the present invention. FIG. 6 differs from FIG. 4 in that the digital PLL circuit 24 is removed. In FIG. 6, the components identical with those disclosed in FIG. 4 are denoted by the same reference numerals and will not be explained again. In FIG. 6, the output signal (or the input signal) of the equalizer 25 is supplied to a phase comparator 52 to compare the phase of the zero-cross point and the phase of the bit clock.

A phase error signal produced from the phase comparator 52 is supplied to a loop filter 53. The frequency control apparatus 23 sends an error signal to the loop filter 53 to control the characteristics of the loop filter 53. An output signal of the loop filter 53, serving as a control voltage, is applied to a voltage-controlled oscillator (VCO) 54. An output signal of the VCO 54 is used as the system clock. The frequency of the system clock is equivalent to one of natural number times the bit clock.

Figure 7:
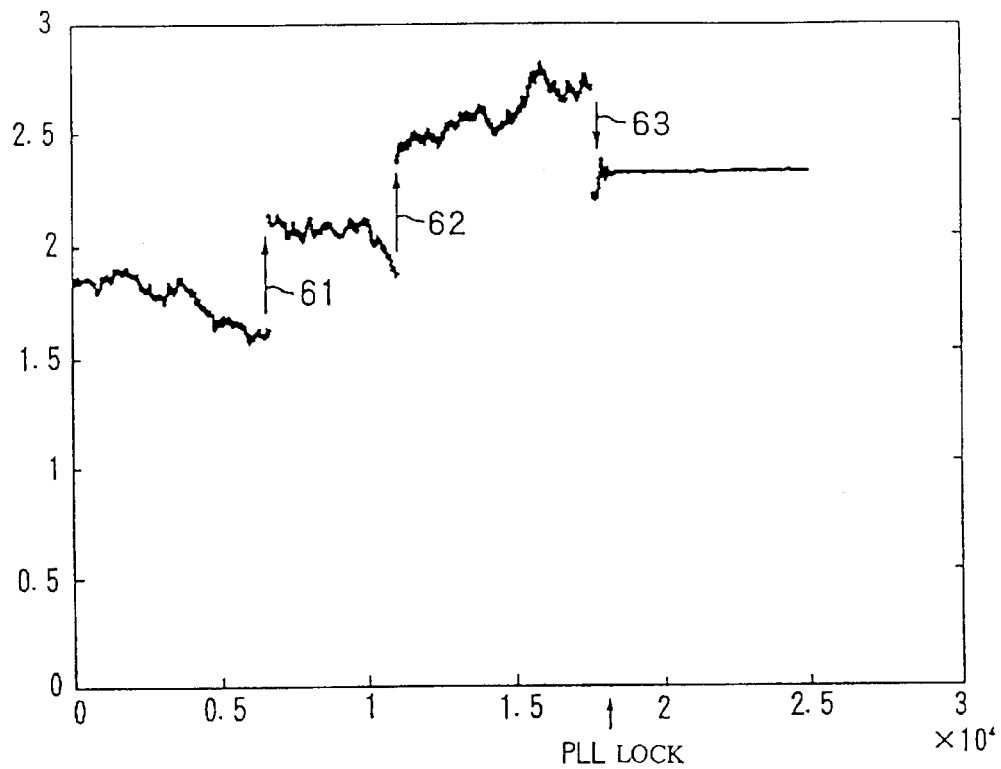
FIG. 7 is a graph explaining the function and effect of the present invention.

Next, the simulation result of this embodiment will be explained. FIG. 7 shows a lock-in of the PLL circuit in accordance with the frequency control apparatus of the present invention. In FIG. 7, an ordinate (i.e., a vertical axis) represents a ratio of the master clock frequency to the bit clock frequency, i.e. (Master clock frequency)/(Bit clock frequency). An abscissa (i.e., a horizontal axis) represents the time. The PLL circuit 24 switches the lock frequency in response to every input of the error signal (i.e., frequency control signal) supplied from the frequency control apparatus 23, as shown by 61, 62 and 63. Thus, it becomes possible to promptly lock the frequency. Such a frequency switching was not performed in the prior art apparatus. Or, the prompt lock-in was not realized due to erroneous jumps.

Figure 8:
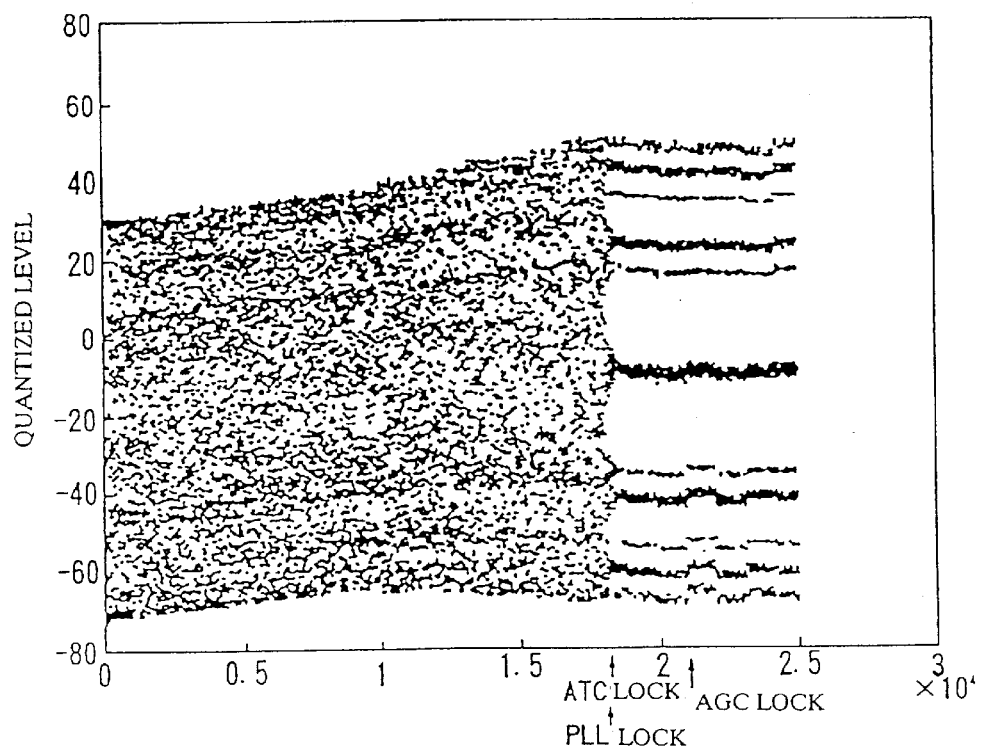
FIG. 8 is a graph showing an example of a sample pattern of a signal of the playback or reproducing apparatus in accordance with the present invention.

FIG. 8 shows an example of the sample pattern of the signal of the playback or reproducing apparatus employing the frequency control apparatus of the present invention. In FIG. 8, an ordinate (i.e., a vertical axis) represents a quantized level and an abscissa (i.e., a horizontal axis) represents the time. FIG. 8 shows that, even in a worst condition where the D.C. level, the gain, and the frequency are deviated from the regular values by an amount of −20%, the pull-in operation by the frequency control apparatus 23 starts prior to the ATC and AGC locks in the DC/gain control circuit 22. Including the frequency, the PLL circuit 24 completes the lock before the ATC and AGC locks in the DC/gain control circuit 22. The decoding signal is obtained after the lock of the PLL circuit.

Figure 9A:
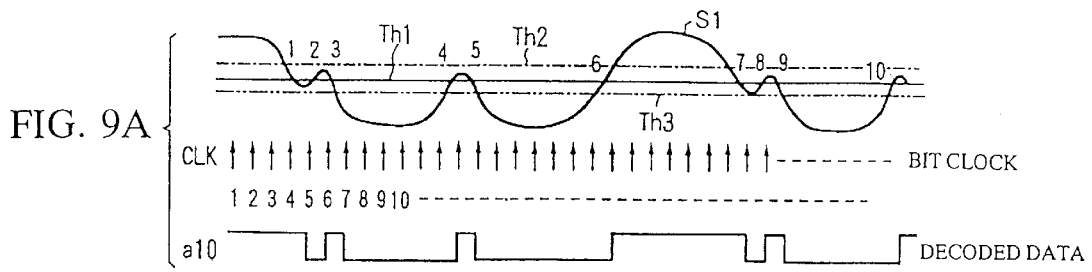
FIGS. 9A to 9D are views showing the relationship between the threshold levels, the reproduced signal and the decoding data in several cases in accordance with the present invention.
Figure 9B:
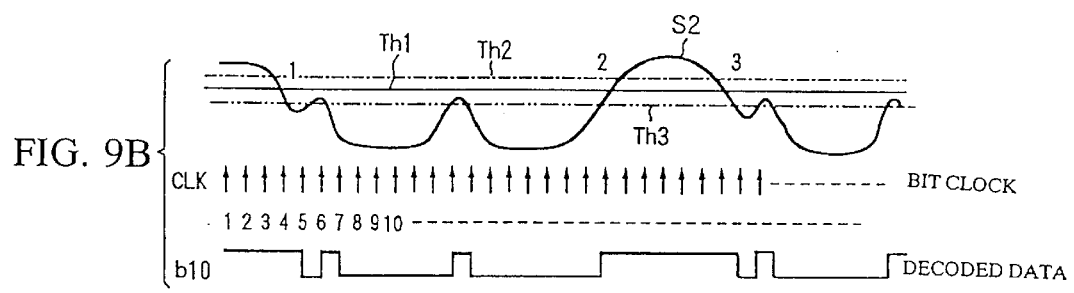

The operation of this embodiment will be explained with reference to FIG. 9A to FIG. 9D. FIG. 9A shows a case where a reproduced signal SI has a symmetric waveform in the up-and-down direction and three threshold levels Th1, Th2 and Th3 are ideal (i.e., adequately positioned). In this case, a correct decoding data a10 is obtained based on the cross detection result of the threshold level Th1 in synchronism with a bit clock CLK. FIG. 9B shows another case observed in the converging process of the ATC where the three threshold levels deviate from the ideal positions with respect to a reproduced signal S2 having a symmetric waveform in the up-and-down direction. In this case, a decoding data b10 is obtained based on the cross detection result of the threshold level Th3 in synchronism with the bit clock CLK. The obtained decoding data b10 is identical with the correct decoding data a10.

Figure 9C:
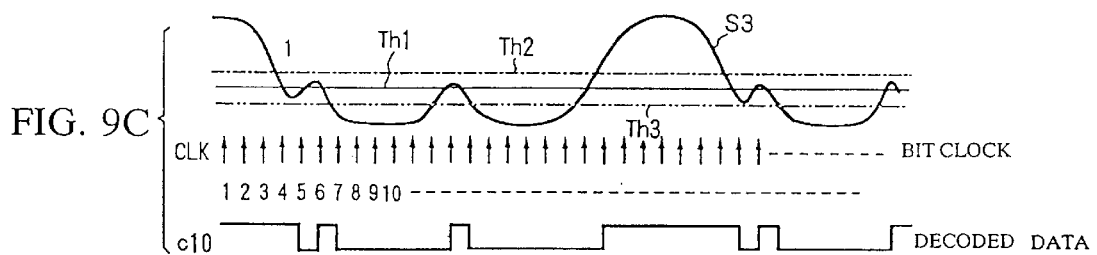
Figure 9D:
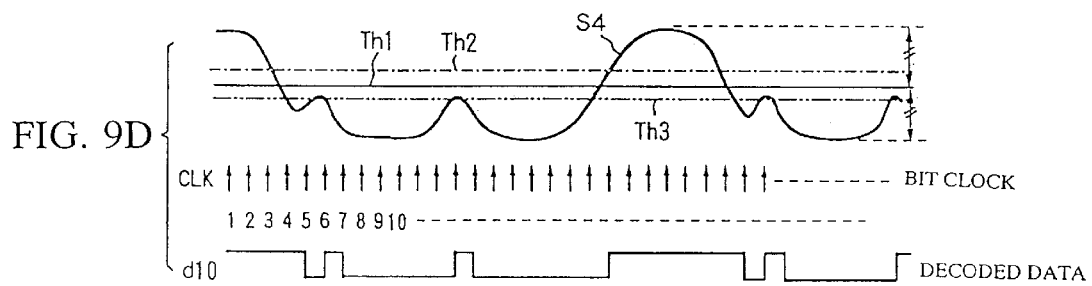
Figure 10:
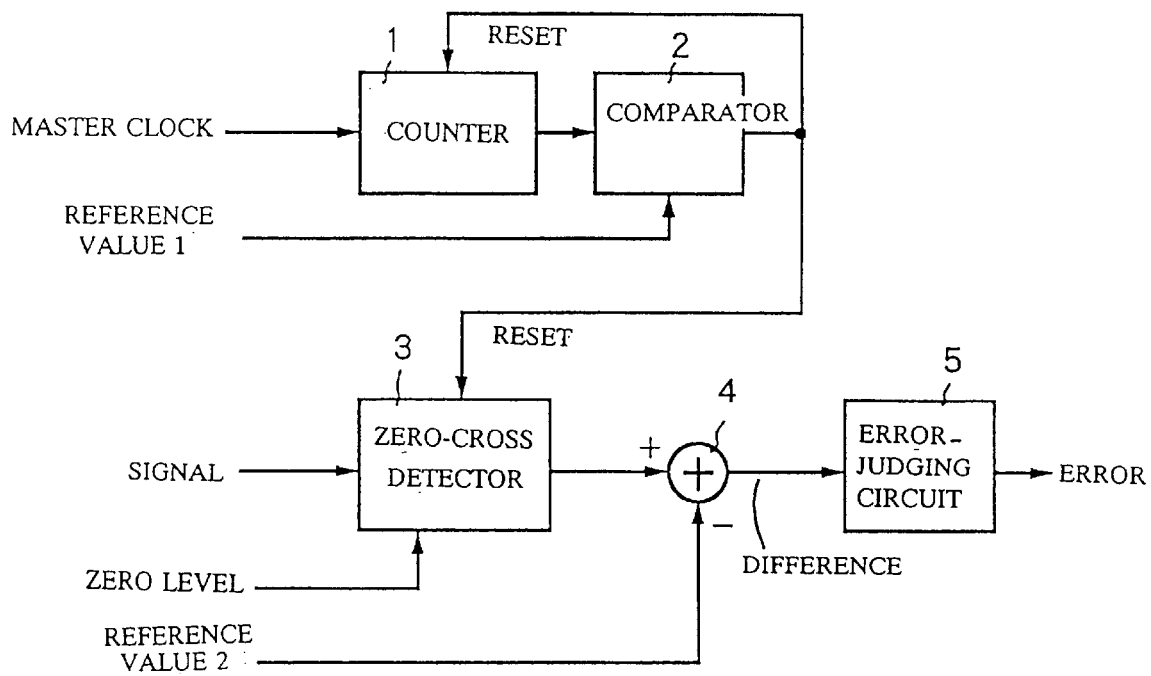
FIG. 10 is a block diagram showing an example of a conventional frequency control apparatus.
Figure 11:
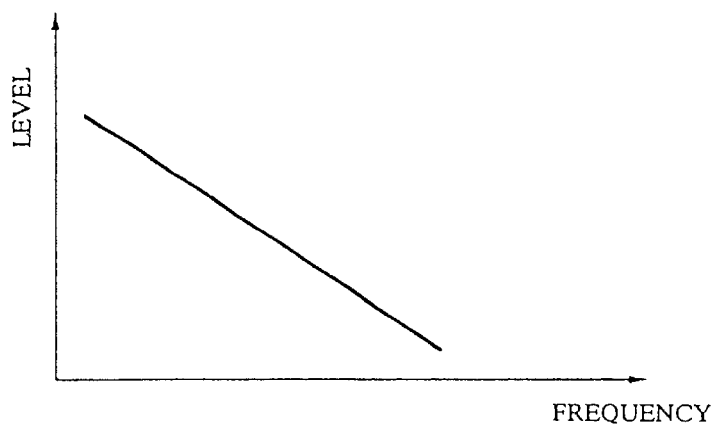
FIG. 11 is a graph showing an example of the frequency characteristics of a playback or reproducing apparatus.
Figure 12A:
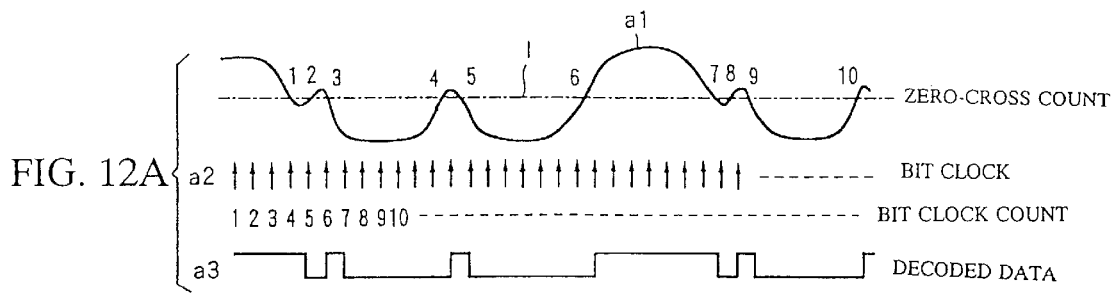
FIGS. 12A to 12D are views showing the relationship between the threshold level, the reproduced signal and the decoding data in several cases in the conventional frequency control apparatus.
Figure 12B:
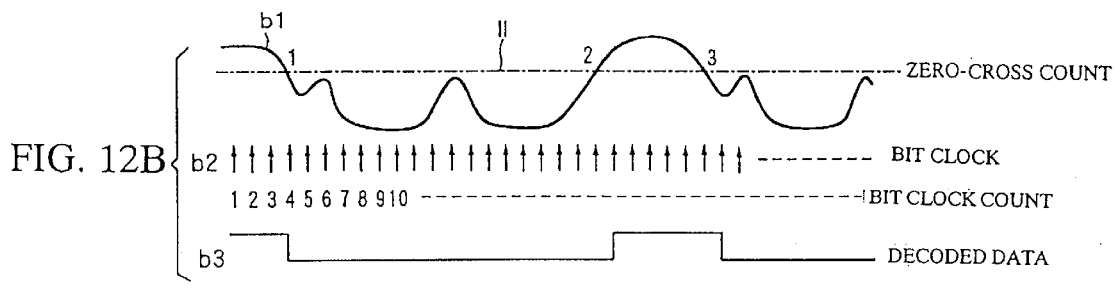
Figure 12C:
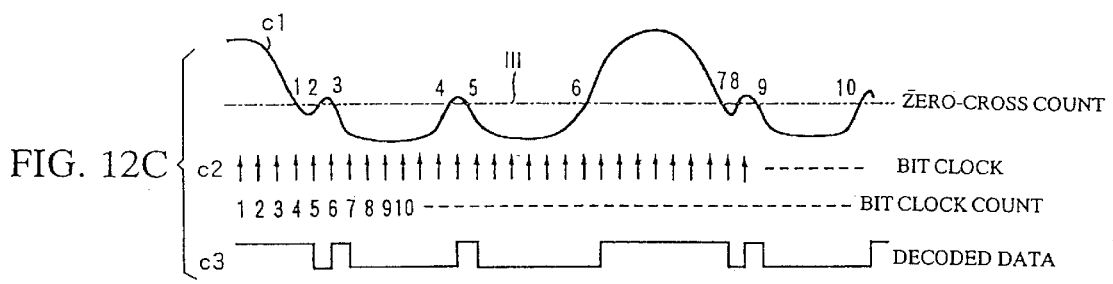
Figure 12D:
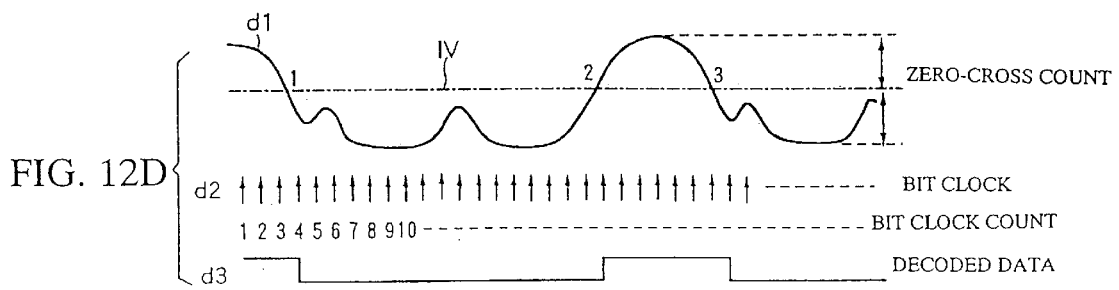

Furthermore, FIG. 9C shows another case where a reproduced signal S3 has an asymmetric waveform in the up-and-down direction but the three threshold levels are ideal. In this case, a correct decoding data c10 is obtained based on the cross detection result of the threshold level Th1 in synchronism with the bit clock CLK. FIG. 9D shows another case where a reproduced signal S4 is asymmetric in the up-and-down direction and the ATC is performed to equalize the threshold level Th1 to the center of the maximum amplitude of the reproduced signal S4. In this case, a decoding data d10 is obtained based on the cross detection result of the threshold level Th3 in synchronism with the bit clock CLK. The obtained decoding data d10 is identical with the correct decoding data c10.

The present invention is not limited to the above-described embodiments. For example, it is possible to replace the down counter 14 disclosed in FIG. 1 with an up counter which increments the count value in response to the bit clock. When the count value (i.e., cross count value) becomes a predetermined value, the comparator detects a deviation of the count value of the up counter relative to the proper value. The error signal is produced based on the a comparison result. An automatic equalizer or a fixed equalizer can be used as the equalizer 25. If preferable, it is possible to remove the equalizer 25.

Furthermore, according to the above-described embodiment, the error signal is generated every time the cross count value reaches the preset value. However, it is possible to generate the error signal only when the similar error is continuously detected. Furthermore, this invention can be combined with a conventionally known error detecting apparatus utilizing a wobbling of an optical spot. Furthermore, when the cross detection result is not obtained within a predetermined time, it is possible to utilize the detected signal as a silent signal. Moreover, a silent signal detecting section may be provided as a an external block for eliminating any incorrect or error signal.

As explained in the foregoing description, the present invention checks the bit clock count value when the cross count value becomes the common reference value, and generates the error signal based on a deviation of the bit clock count value relative to the proper value. Thus, the error signal is produced in accordance with a signal rate of the reproduced signal. The pull-in process of the phase-locked loop circuit is effectively and promptly performed in a high-speed reproduced speed.

Furthermore, the present invention makes it possible to realize the frequency control without relying on the ATC for the reproduced signal. Thus, it becomes possible to quickly accomplish the pull-in process of the phase-locked loop circuit. Moreover, according to the present invention, the circuit can be constituted as a digital circuit. The circuit can be easily integrated. The reliability can be improved.

Figure 13:
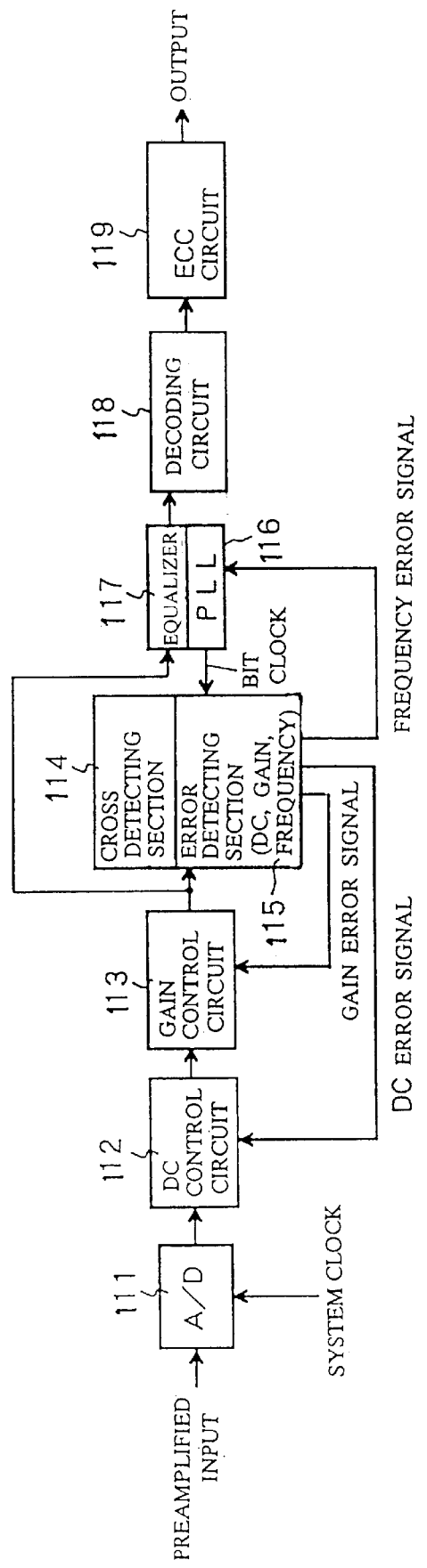
FIG. 13 is a block diagram showing a digital signal playback or reproducing apparatus in accordance with a preferred embodiment of the present invention.

FIG. 13 is a block diagram showing a digital signal playback or reproducing apparatus in accordance with a preferred embodiment of the present invention. In FIG. 13, the reproduced signal from a recording medium, such as an optical disk, is pre-amplified through a preamplifier (not shown). The output of the preamplifier is supplied to an A/D converter 111 in which the inputted signal is converted into a digital signal in response to a system clock. The digital output signal of the A/D converter 111 is suppled to a DC control circuit 112 in which the center level (i.e., DC level) of the inputted signal is adjusted to an optimum level or in which the threshold level is shifted based on a DC error signal supplied from a later-described error detecting section 115. An output signal of the DC control circuit 112 is supplied to a gain control circuit 113 in which the amplitude of the inputted signal is adjusted to a constant value or in which the threshold clearances are narrowed or reduced based on a gain error signal supplied from the error detecting section 115. An output signal of the gain control circuit 113 is supplied to a cross detecting section 114 and also to the error detecting section 115.

Figure 14:
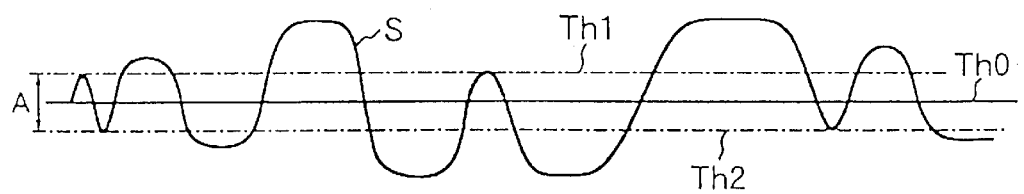
FIG. 14 is a view illustrating an operation of the cross detecting section shown in FIG. 13.

As shown in FIG. 14, the cross detecting section 114 has three, i.e., first to third, threshold levels. The first threshold level Th1 is equivalent to an upper peak value of the reproduced signal S at the minimum length between transitions having an amplitude A. The second threshold level Th2 is equivalent to a lower peak value of the reproduced signal S at the minimum length between transitions. The third threshold level Th0 is equivalent to the mid level between the first and second threshold levels. The cross detecting section 114 increments a count value for each of the threshold levels Th0, Th1 and Th2 in response to the change of the reproduced signal across each threshold level. When any one of three count values of the threshold levels Th0, Th1 and Th2 reaches a preset value, the cross detecting section 114 clears all of the count values and then restarts the counting operation from the beginning.

Among the three threshold levels Th0, Th1 and Th2, the count value of the centrally positioned threshold Th0 is supposed to be largest on the reproduced signal during a predetermined time interval. Accordingly, it is believed that the cross count value C0 of the central threshold level Th0 is fastest in reaching the preset value.

Hence, the error detecting section 115 generates the DC error signal and the gain error signal based on comparison result of the cross count values in the cross detecting section 114; i.e., in the relative relationship between the cross count value C0 of the central threshold level Th0 and a cross count value C1 of the upper threshold level Th1, or a cross count value C2 of the lower threshold level Th2. In accordance with the DC error signal and the gain error signal, the DC control circuit 112 and the gain control circuit 113 control the DC level and the amplitude of the reproduced signal so that the cross count value C0 becomes larger than the other cross count values C1 and C2.

Figure 23:
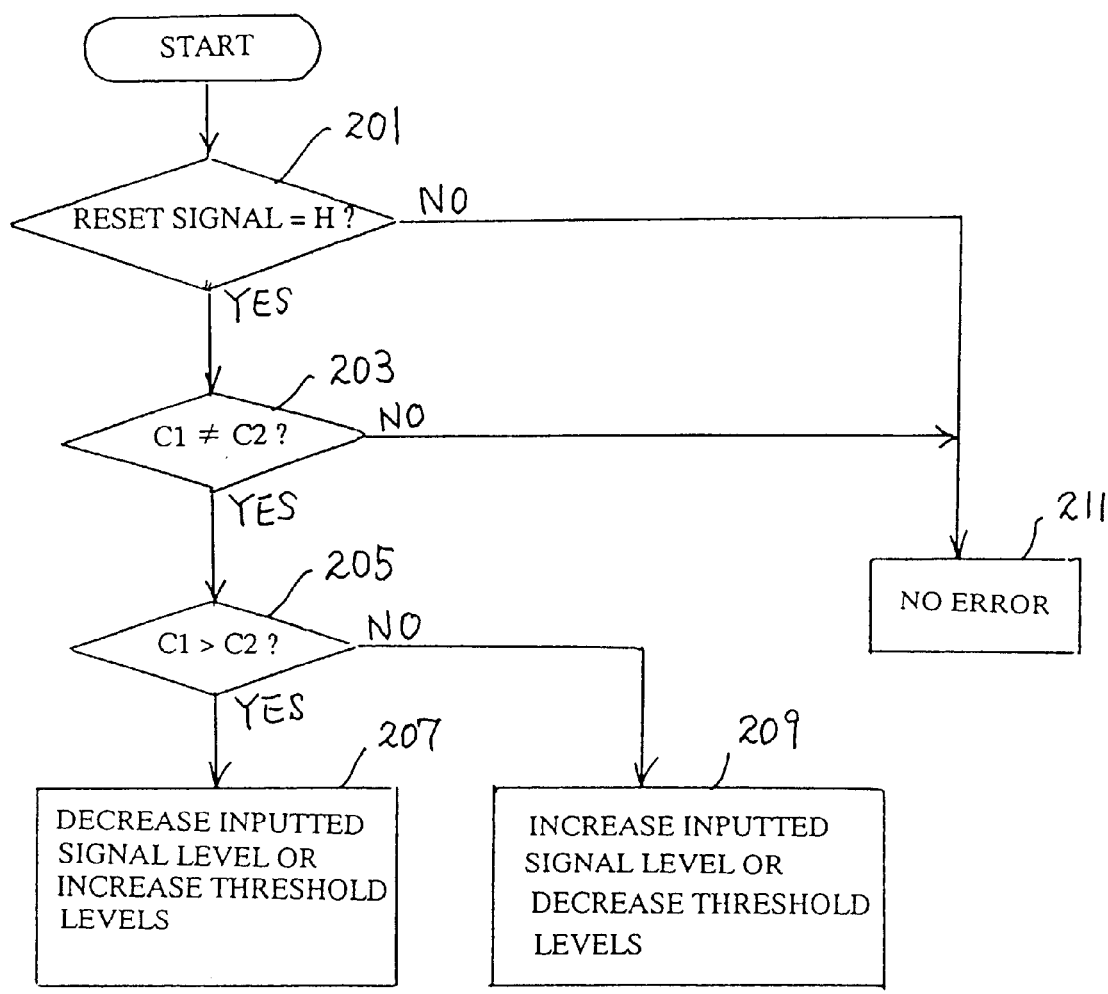
FIG. 23 is a flowchart showing an example of the processing for producing an ATC signal.

FIG. 23 is a flowchart showing an example of the processing for producing an ATC signal. When the cross count value C0 reaches the preset value and the reset signal becomes "High"(i.e., YES in step 201), other cross count values C1 and C2 should be smaller than C0 (i.e., C0>C1, C2). Next, the cross count values C1 and C2 are compared with each other. When the reset signal is "Low" (i.e., NO in step 201) or when the relationship C1=C2 is confirmed (i.e., NO in step 203), no error is present (step 211). When the relationship C1>C2 is confirmed (i.e., YES in step 205), it is understood that the DC level of the reproduced signal is offset toward the upper threshold level Th1. In this case, the error detecting section 115 produces the DC error signal so as to shift the DC level of the reproduced signal toward the lower threshold level Th2 or so as to shift the threshold levels Th0, Th1 and Th2 toward the upper level (step 207). When the relationship C1<C2 is confirmed (i.e., NO in step 205), it is understood that the DC level of the reproduced signal is offset toward the lower threshold level Th2. In this case, the error detecting section 115 produces the DC error signal so as to shift the DC level of the reproduced signal toward the upper threshold level Th1 or so as to shift the threshold levels Th0, Th1 and Th2 toward the lower level (step 209).

When the cross count value C1 reaches the preset value first, the other cross count values C0 and C2 are smaller than C1 (i.e., C1>C0, C2). In this case, it is believed that the reproduced signal is largely offset to an upper side. Thus, the error detecting section 115 produces the DC error signal so as to shift the DC level of the reproduced signal to a lower level. When the cross count value C2 reaches the preset value first, the other cross count values C0 and C1 are smaller than C2 (i.e., C2>C0, C1). In this case, it is believed that the reproduced signal is largely offset to a lower side. Thus, the error detecting section 115 produces the DC error signal so as to shift the DC level of the reproduced signal to an upper level. The DC control circuit 112 performs the DC control (i.e., ATC) based on the supplied DC error signal.

Figure 24:
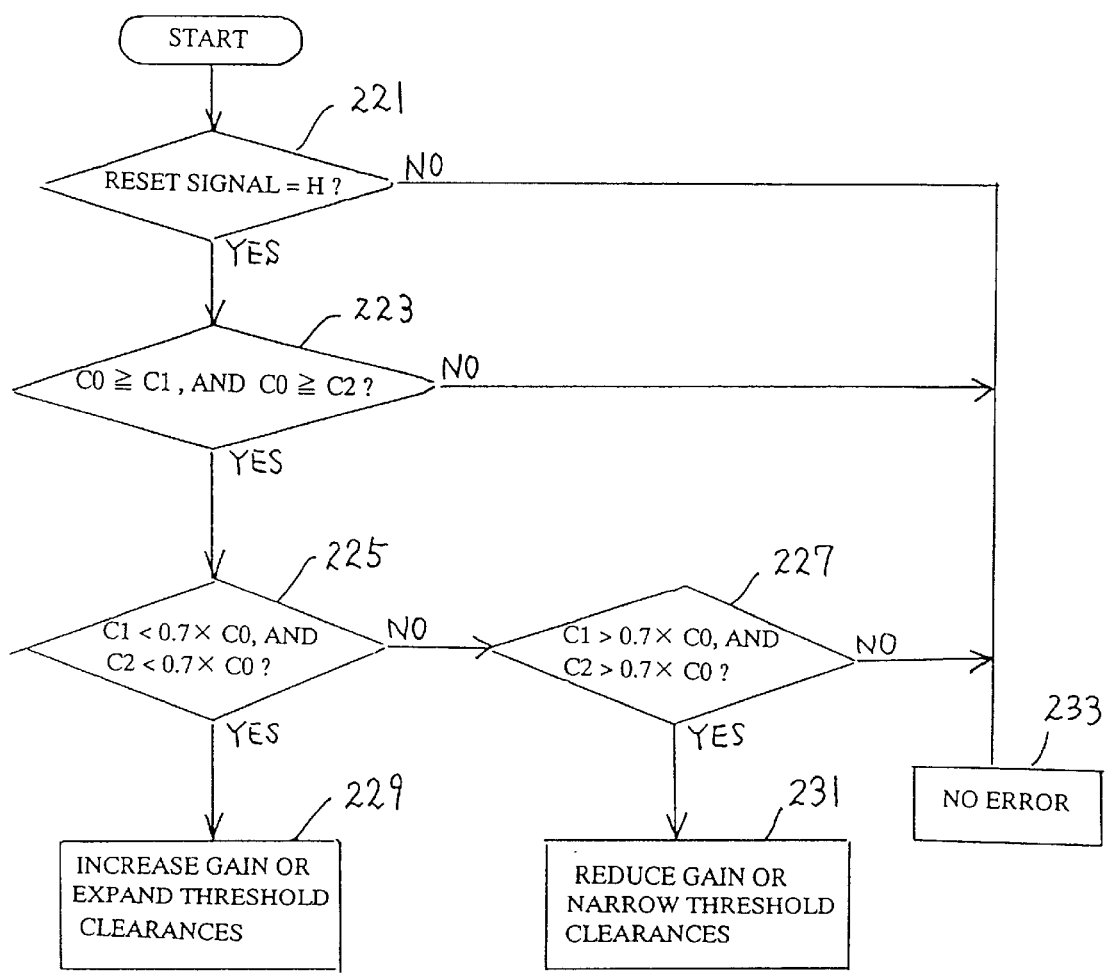
FIG. 24 is a flowchart showing an example of the processing for producing an AGC signal.

FIG. 24 is a flowchart showing an example of the processing for producing an AGC signal. When the cross count value C0 reaches the preset value and the reset signal becomes "High" (i.e., YES in step 221), it is understood that the amplitude of the reproduced signal is within a proper region. In this case, it is checked whether both of the cross count values C1 and C2 are not larger than the cross count value C0 (step 223). When the reset signal is "Low" (i.e., NO in the step 221) or when the judgement result is NO in the step 223, no error is present (step 233). Then, when the judgement result is YES in the step 223, each of the cross count values C1 and C2 is compared with a predetermined value (e.g., 0.7×C0) which is smaller than the cross count value C0 and is determined by considering the influence of noise. When the cross count values C1 and C2 are smaller than the predetermined value (i.e., YES in the step 225), it is concluded that the amplitude of the reproduced signal is small. The error detecting section 115 produces the gain error signal so as to increase the gain or so as to expand the threshold clearances (step 229). When both of the cross count values C1 and C2 are larger than the predetermined value (i.e., NO in the step 225 and YES in step 227), it is concluded that the amplitude of the reproduced signal is large. The error detecting section 115 produces the gain error signal so as to decrease the gain or so as to narrow (or reduce) the threshold clearances (step 231).

When the cross count value C1 or C2 reaches the preset value first, it is supposed the amplitude of the reproduced signal is offset to an upper or lower side. In such a case, the judgement of gain is not accurately performed. Thus, the error detecting section 115 does not generate the gain error signal. In other words, the previous gain is continuously held. The gain control circuit 113 performs the gain control (i.e., AGC) based on the supplied gain error signal.

The error detecting section 115 produces the frequency error signal in the following manner. Even in a transient condition, such as a converging process of the ATC and the AGC, the cross detecting section 114 clears all of three count values C0, C1 and C2 when any one of the count values C0, C1 and C2 reaches the preset value. Then, the cross counting operation is restarted.

Regarding the bit clock count value used for decoding the reproduced signal, the following relationship is established when a time interval is sufficiently longer than each transitional length.

(Bit clock count value)/(Cross count value)=(Average transitional length)

where "Cross count value" is a cross count value obtained when the inversion position is correctly judged, and "Average transitional length" is an average transitional length of the reproduced signal which is run length limited and also is scramble recorded.

When the cross count value becomes a predetermined value, a deviation of the bit clock count value relative to a proper value is checked. The frequency error signal is produced to eliminate this deviation. The frequency control is thus feasible. According to this embodiment, when any one of the count values C0, C1 and C2 becomes the preset value, a deviation of the bit clock count value relative to the proper value is produced. The error detecting section 115 generates the frequency error signal (e.g., +1, 0, −1) so as to eliminate the deviation. The frequency error signal is supplied to the loop filter in a PLL circuit 116.

The pull-in process of the PLL circuit 116 is controlled in response to the frequency error signal. The bit clock frequency, produced from a bit clock generating circuit in the PLL circuit 116, varies. The bit clock is fed back to the error detecting section 115 as a reference signal used for producing the frequency error signal. Alternatively, the:PLL circuit 116 may utilize an output signal of the gain control circuit 113 to produce a bit clock timing signal through a calculation.

An equalizer 117 performs the equalizing processing of the digital reproduced signal based on the bit clock of the PLL circuit 116. An output signal of the equalizer 117 is supplied to a decoding circuit 118. The decoding circuit 118 decodes the inputted digital signal and sends the decoded result to an ECC circuit 119. The ECC circuit 119 performs an error-correcting operation by using an error-correcting code and finally produces the reproduced data. It is possible to integrate all of the above-described circuit components into a digital circuit.

Figure 15:
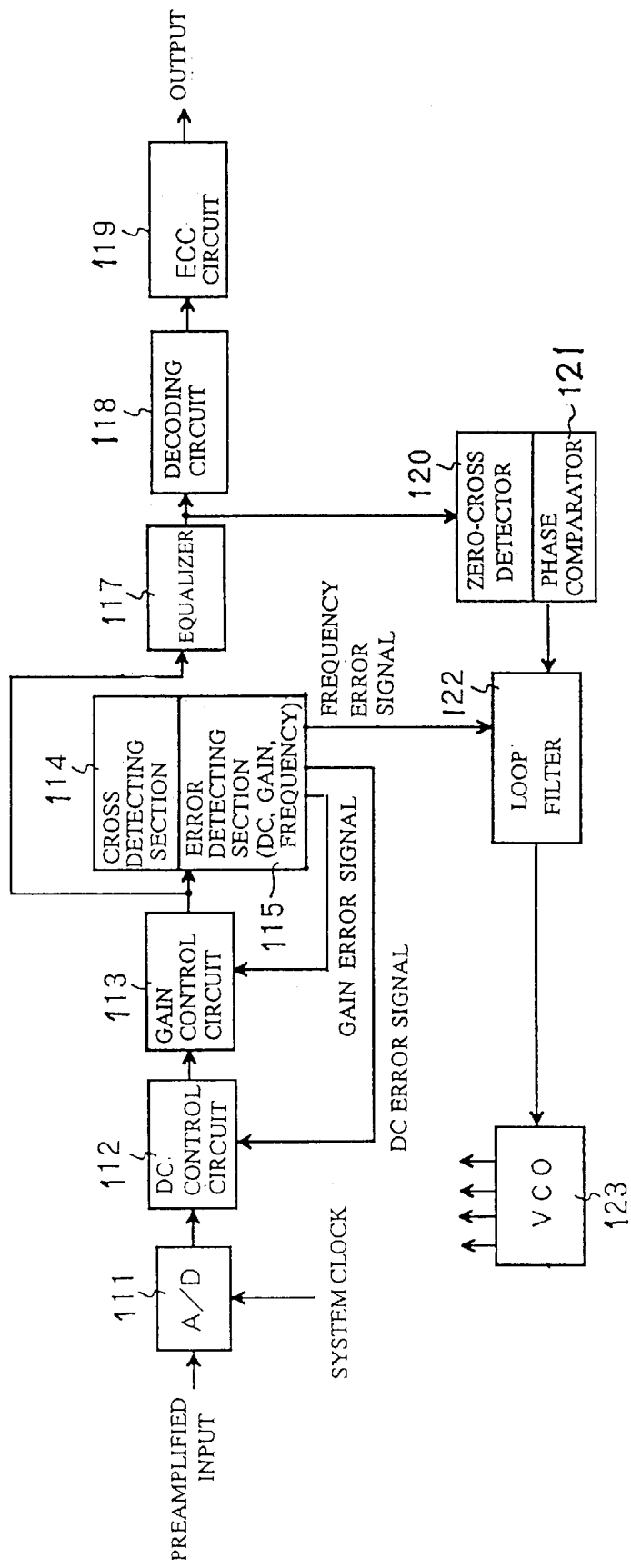
FIG. 15 is block diagram showing a digital signal playback or reproducing apparatus in accordance with another embodiment of the present invention.

Another embodiment of the present invention will be explained with reference to the attached drawings. FIG. 15 is a block diagram showing a digital signal playback or reproducing apparatus. In FIG. 15, components identical with those disclosed in FIG. 13 are denoted by the same reference numerals and will not be explained again. In FIG. 15, the output signal (or the input signal) of the equalizer 117 is supplied to a zero-cross detector 120 to detect the zero cross and is then supplied to a phase comparator 121 to compare the phase of the zero-cross point and the phase of the bit clock.

The phase comparison can be simply performed. For example, a value sampled in response to the bit clock can be used as an error. When the compared phases agree, the phase comparator 121 produces an output of 0. According to the embodiment shown in FIG. 15, the zero-cross detector 120 and the phase comparator 121 cooperate to produce a phase error signal. However, it is possible to use other components to produce the phase error signal.

The phase error signal produced from the phase comparator 121 is supplied to a loop filter 122. The error detecting section 115 sends the frequency error signal to the loop filter 122 to control the characteristics of the loop filter 122. An output signal of the, loop filter 122, serving as a control voltage, is applied to a voltage-controlled oscillator (VCO) 123 to vary its output signal. An output signal of the VCO 123 is used as the system clock. The system clock is a frequency equivalent to natural number times the bit clock.

The loop filter 122 and the VCO 123 can be constituted by either a digital circuit or an analog circuit. When the digital circuit is used, the VCO 123 will be a digital VCO. And, the control voltage applied to the digital VCO is a digital value, not an analog one.

Figure 16:
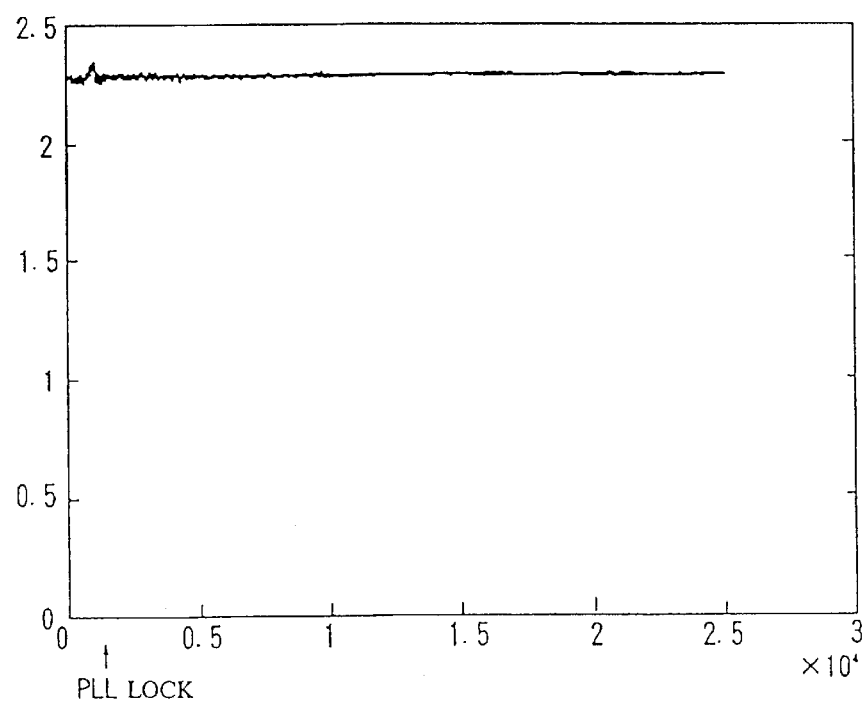
FIG. 16 is a graph showing a lock-in operation of a PLL circuit shown in FIG. 13.
Figure 17:
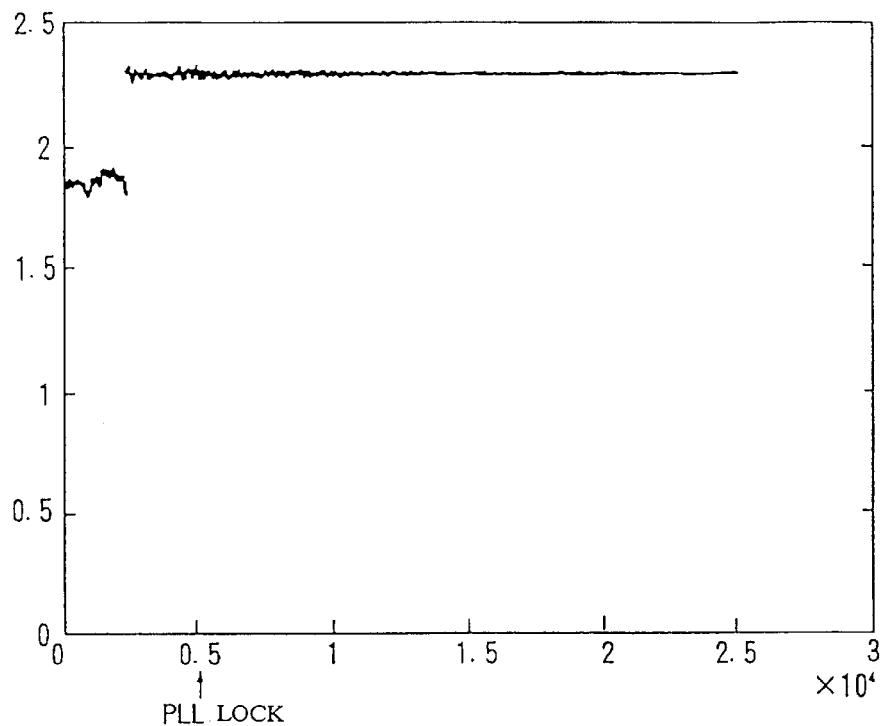
FIG. 17 is a graph showing another lock-in operation of the PLL circuit shown in FIG. 13.
Figure 18:
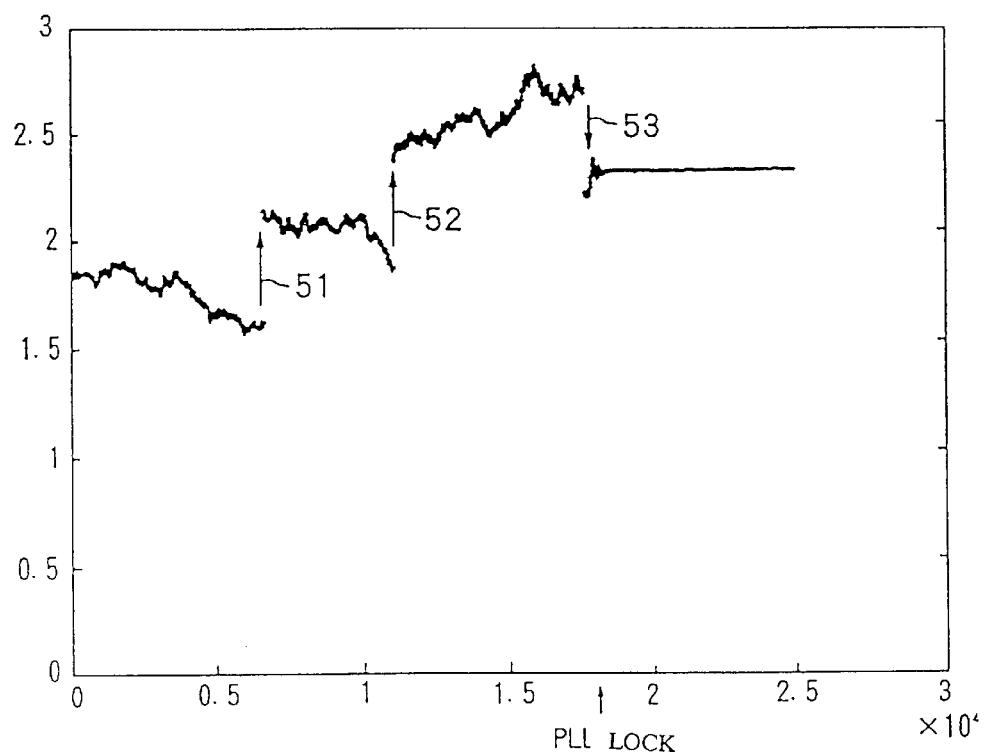
FIG. 18 is a graph showing another lock-in operation of the PLL circuit shown in FIG. 13.

Next, the simulation result of the above-described embodiment will be explained. FIGS. 16, 17 and 18 show several lock-in processes of the PLL circuit 116. In FIGS. 16, 17 and 18, an ordinate (i.e., a vertical axis) represents a ratio of the master clock frequency to the bit clock frequency, i.e. (Master clock frequency)/(Bit clock frequency): An abscissa (i.e., a horizontal axis) represents the time. The PLL circuit 116 switches the lock frequency in response to every input of the frequency error signal (i.e., frequency control signal) supplied from the error detecting section 115. FIG. 16 shows a case where the frequency deviation is substantially 0. FIG. 17 is a case where the frequency deviation is small. FIG. 18 is a worst condition where the D.C. level, the gain, and the frequency are deviated from the regular values by an amount of −20%. Even in such a worst condition, the lock frequency is adequately switched in response to every input of the error signal (i.e., frequency control signal) as shown by 51, 52 and 53. Thus, it becomes possible to promptly lock the frequency. Such a frequency switching was not performed in the prior art apparatus. Or, the prompt lock-in was not realized due to erroneous jumps.

Figure 19:
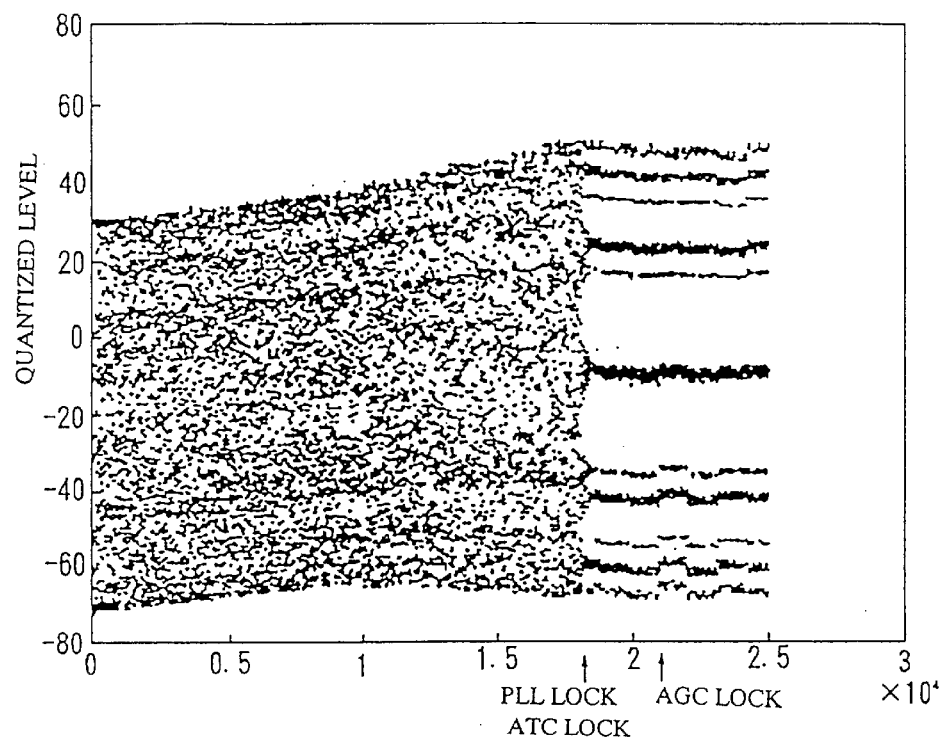
FIG. 19 is a graph showing a sample pattern of a signal in accordance with the digital signal playback or reproducing apparatus of the present invention.
Figure 20:
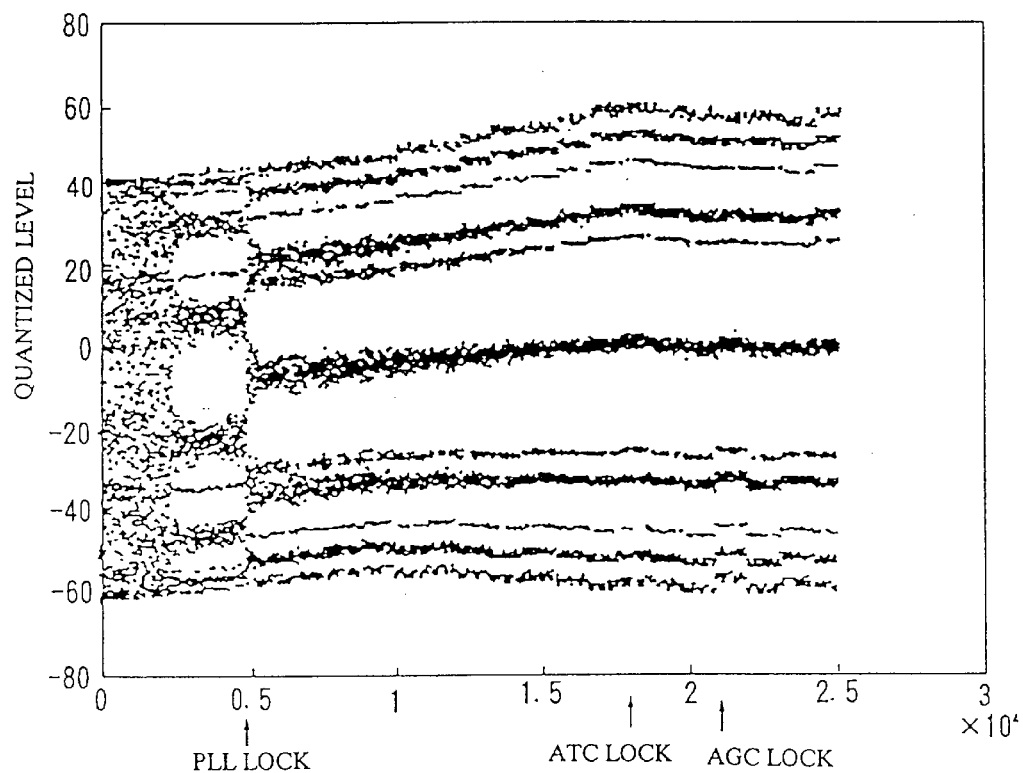
FIG. 20 is a graph showing another sample pattern of a signal in accordance with the digital signal playback or reproducing apparatus of the present invention.
Figure 21:
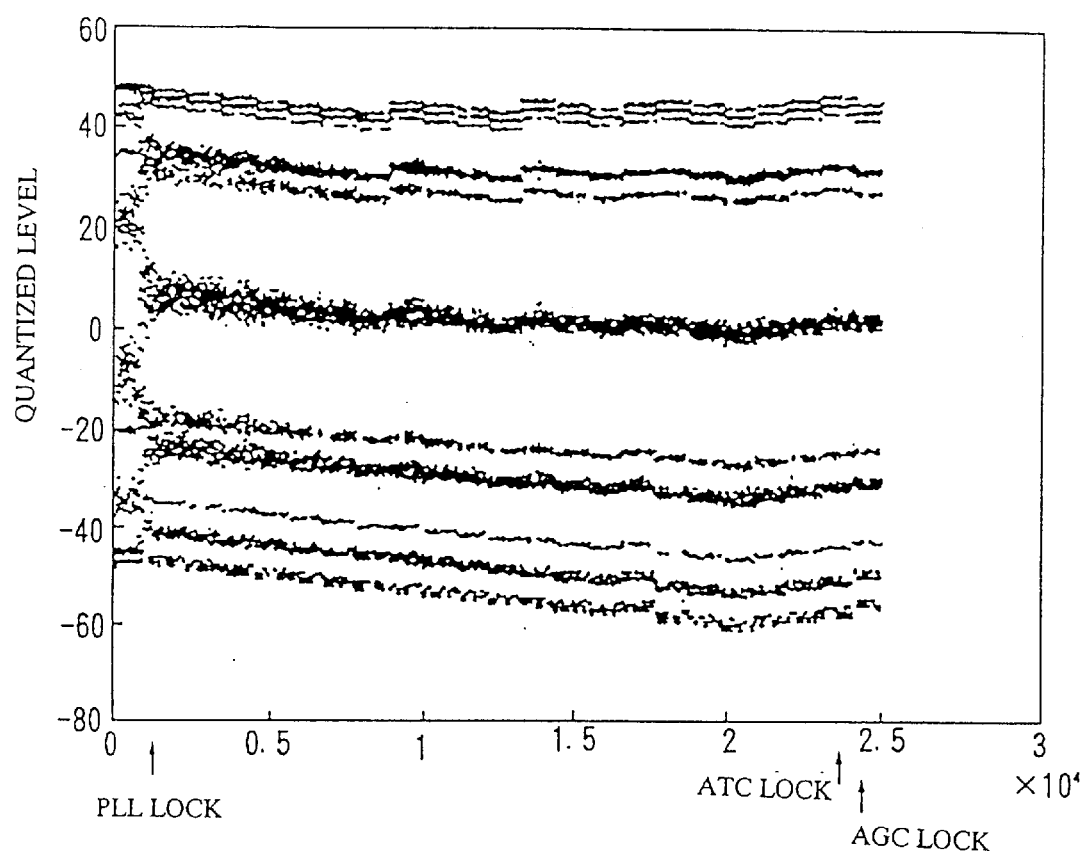
FIG. 21 is a graph showing another sample pattern of a signal in accordance with the digital signal playback or reproducing apparatus of the present invention.

FIGS. 19, 20 and 21 show several examples of the sample pattern of the signal of the digital signal playback or reproducing apparatus in accordance with the present invention. In FIGS. 19, 20 and 21, an ordinate (i.e., a vertical axis) represents a quantized level and an abscissa (i.e., a horizontal axis) represents the time. An example of FIG. 19 shows that, even in a worst condition where the D.C. level, the gain, and the frequency are deviated from the regular values by an amount of −20%, the pull-in process starts in response to the frequency error signal prior to the lock of ATC and AGC.

The ATC lock is a stabilized condition of the DC control circuit 112 feedback controlled based on the DC error signal. The AGC lock is a stabilized condition of the gain control circuit 113 feedback controlled based on the gain error signal. The timing of the ATC lock is substantially the same as that of the lock of PLL circuit 16 (refer to FIG. 19). The AGC lock follows the lock of PLL circuit 116 (refer to FIG. 19). Thus, it is understood that the lock of the PLL circuit 116 is simultaneous with the ATC lock or precedes the AGC lock. It is also understood that the decoding signal is obtained after the lock of the PLL circuit 116. FIG. 20 is characteristic in that a frequency deviation is small so that the operations of the AGC and the ATC can be easily understood.

Figure 22:
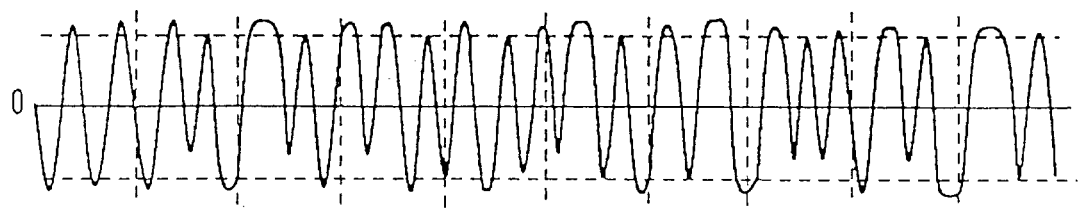
FIG. 22 is a view showing an example of a signal waveform asymmetric in the up-and-down direction.

FIG. 21 shows a sample pattern of a signal when the waveform of the reproduced signal is asymmetric in the up-and-down direction as shown in FIG. 22. It is understood, even in this case, that the PLL circuit 116 locks first and the ATC locks next and the AGC locks finally. In the beginning, the peak-to-peak center of the waveform is equalized to 0. It is understood that the ATC and the AGC are effective to control the waveform to an optimum position using the minimum inversional transition.

As described above, the FIG. 13 embodiment independently performs the ATC, the AGC, and the frequency control. Even when the reproduced signal is an irregular signal with an asymmetric waveform in the up-and-down direction, the ATC, the AGC, and the frequency control can be promptly accomplished so that the signal waveform is converged (locked) to an optimum position. Furthermore, the above-described embodiment commonly utilizes the cross count value of the cross detecting section 114 for obtaining each of the DC error signal, the gain error signal, and the frequency error signal. The circuit arrangement can be simplified. The cost of the circuit is inexpensive. Even when the reproduced signal is a high-speed signal, various error signals are produced based on the result as to whether or not the cross count value reaches the preset value. This makes it possible to effectively and promptly accomplish the ATC, the AGC, and the frequency control, rather than using the cross count value obtained within a predetermined time interval.

The present invention is not limited to the above-described embodiment. For example, it is possible to use four or more threshold levels in the cross detecting circuit. Furthermore, the present invention is not limited to the digital signal reproducing apparatus used for decoding a digital signal reproduced from a recording medium. For example, the present invention can be applied to a digital signal transmitted and received by cable or radio. Furthermore, the present invention makes it possible to improve the circuit performance by switching the loop characteristics.

The error detecting section 115 produces all of the DC error signal, the gain error signal, and the frequency error signal based on the relative relationship between count values of respective thresholds levels at the time the count value of any threshold level reaches the preset value. However, it is possible to modify the error detecting section 115 so as to produce at least one of the DC error signal, the gain error signal, and the frequency error signal.

As explained in the foregoing description, the present invention causes the error detecting section to independently produce the DC error signal, the gain error signal, and the frequency error signal based on the relative relationship between count values of three or more thresholds levels of the cross detecting section at the time the count value of any threshold level reaches the preset value. Thus, the ATC, the AGC and the frequency control can be independently performed. Even when the reproduced signal is an irregular signal with an asymmetric waveform in the up-and-down direction, the ATC, the AGC, and the frequency control can be promptly accomplished so that the signal waveform is converged (locked) to an optimum position. When the playback or reproducing operation is carried out at a higher speed, it becomes possible to effectively and promptly accomplish the ATC, the AGC, and the frequency control.

Furthermore, the present invention causes the error detecting section to commonly utilize the cross count value of the cross detecting section for obtaining each of the DC error signal, the gain error signal, and the frequency error signal. The total number of circuit components can be reduced. The circuit arrangement can be simplified. The cost of the circuit is inexpensive. As each section of the apparatus can be constituted as a digital circuit. The circuit can be easily integrated. An integrated circuit is compact in size and reliability in performance.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A frequency control apparatus for controlling a pull-in process of a phase-locked loop circuit which outputs a signal for accurately obtaining the data from an inputted reproduced signal at predetermined time intervals in a phase-locked manner, said frequency control apparatus comprising:

n pieces of cross detectors having n pieces of threshold levels different from each other and smaller than a maximum amplitude of said inputted reproduced signal, wherein n is an integer equal to or larger than 3, each cross detector incrementing a count value in response to a change of said inputted reproduced signal across a threshold level of said each cross detector and outputting an accumulated count value as a cross count value;

counting means for counting a bit clock;

reset means for comparing each of the cross count values outputted from said n pieces of cross detectors with a common reference value and producing a reset signal when one of said cross count values agrees with said common reference value to reset all of said n pieces of cross detectors and said counting means; and an error judging circuit for detecting a deviation of a count value of said counting means relative to a proper value and for producing an error signal based on a detected deviation, and further for outputting said error signal to a loop filter in said phase-locked loop circuit.

2. The frequency control apparatus in accordance with claim 1, wherein said n pieces of threshold levels are equally spaced to provide same clearances between two adjacent threshold levels, and the clearances is smaller than an amplitude at a minimum inversional transition of said inputted reproduced signal.

3. The frequency control apparatus in accordance with claim 1, wherein said common reference value is equivalent to a proper zero-cross count value averaged during a time interval sufficiently longer than each transitional length, and said counting means is for setting an initial value equivalent to a proper bit clock count value when said zero-cross count value becomes a predetermined value, said counting means including a down counter which decrements the count value in response to each entry of the bit clock.

4. A frequency control apparatus for controlling a pull-in process of a phase-locked loop circuit which outputs a signal for accurately obtaining the data from an inputted reproduced signal at predetermined time intervals in a phase-locked manner, said frequency control apparatus comprising:

n pieces of cross detectors having n pieces of threshold levels different from each other and smaller than a maximum amplitude of said inputted reproduced signal, wherein n is an integer equal to or larger than 3, each cross detector incrementing a count value in response to a change of said inputted reproduced signal across a threshold level of said each cross detector and outputting an accumulated count value as a cross count value, each cross detector outputting a transitional timing signal;

n pieces of transitional length detectors each detecting a maximum transitional length based on the transitional timing signal produced from a corresponding one of said n pieces of cross detectors;

reset means for comparing each of the cross count values outputted from said n pieces of cross detectors with a common reference value and producing a reset signal when one of said cross count values agrees with said common reference value to reset all of said n pieces of cross detectors and said transitional length detectors;

selecting means for selecting a maximum transitional length detected by the transitional length detector which receives the cross count value agreeing with said common reference value from one of said n pieces of cross detectors; and a comparing circuit for detecting a deviation of said maximum transitional length selected by said selecting means relative to a proper value and for producing an error signal based on a detected deviation, and further for outputting said error signal to a loop filter in said phase-locked loop circuit.

5. The frequency control apparatus in accordance with claim 4, wherein said n pieces of threshold levels are equally spaced to provide same clearances between two adjacent threshold levels, and the clearances is smaller than an amplitude at a minimum inversional transition of said inputted reproduced signal.

6. A digital signal reproducing apparatus comprising:

control means for performing at least one of a DC control for controlling the DC level of an inputted reproduced signal or controlling threshold levels based on a DC error signal and a gain control for controlling the amplitude of said inputted reproduced signal or controlling threshold clearances based on a gain error signal;

a cross detecting section having three or more threshold levels different from each other and smaller than a maximum amplitude of said reproduced signal obtained from said control means, incrementing a count value for each threshold level in response to a change of said reproduced signal across said each threshold level, clearing all of count values when the count value of any threshold level reaches a preset value, and restarting said increment operation of said count value for each threshold level in response to the change of said reproduced signal across said each threshold level;

a phase-locked loop circuit for generating a bit clock; and an error detecting section for generating at least one of said DC error signal and said gain error signal based on a relative relationship between the count values of said threshold levels at the time the count value of any threshold level reaches said preset value, wherein said error detecting section generates said DC error signal so as to shift the DC level of said reproduced signal toward a threshold level corresponding to a smallest count value among said count values, and said error detecting section is responsive to a first count value corresponding to a central threshold level and, when said first count value reaches said preset value, compares each of second count values other than said first count value with a predetermined value which is smaller than said first count value, and generates said gain error signal to increase the gain in a case where said second count values are smaller than said predetermined value and also to decrease the gain in a case where said second count values are larger than said predetermined value and smaller than said first count value.

7. The digital signal reproducing apparatus in accordance with claim 6, wherein said error detecting section further generates a frequency error signal for controlling a pull-in process in said phase-locked loop circuit based on a detected deviation of a bit clock count value relative to a proper value at the time the count value of any threshold level reaches said preset value.

8. The digital signal reproducing apparatus in accordance with claim 6, wherein said error detecting section does not produce said gain error signal when any one of said second count values reaches said preset value.

9. The digital signal reproducing apparatus in accordance with claim 6, wherein said cross detecting section has first and second threshold levels equivalent to upper and lower peak values of said reproduced signal at a minimum inversional transition and a third threshold level equivalent to a mid level between said first and second threshold levels, and said cross detecting section increments the count value for each of said first to third threshold levels in response to a change of said reproduced signal across said each of said first to third threshold levels.

10. A digital signal reproducing apparatus comprising:
control means for performing at least one of a DC control for controlling the DC level of an inputted reproduced signal or controlling threshold levels based on a DC error signal and a gain control for controlling the amplitude of said reproduced signal or controlling threshold clearances based on a gain error signal;
a cross detecting section having three or more threshold levels different from each other and smaller than a maximum amplitude of said reproduced signal obtained from said control means, incrementing a count value for each threshold level in response to a change of said reproduced signal across said each threshold level, clearing all of count values when the count value of any threshold level reaches a preset value, and restarting said increment operation of said count value for each threshold level in response to the change of said reproduced signal across said each threshold level;
an error detecting section for generating at least one of said DC error signal and said gain error signal based on a relative relationship between the count values of said threshold levels at the time the count value of any threshold level reaches said preset value;
phase comparing means for generating a phase error signal with respect to the reproduced signal outputted from said control means or a calculated signal derived from said reproduced signal;
a loop filter for receiving said phase error signal; and
an oscillator for receiving an output signal of said loop filter as a control voltage and generating a bit clock,
wherein said error detecting section generates said DC error signal so as to shift the DC level of said reproduced signal toward a threshold level corresponding to a smallest count value among said count values, and
said error detecting section is responsive to a first count value corresponding to a central threshold level and, when said first count value reaches said preset value, compares each of second count values other than said first count value with a predetermined value which is smaller than said first count value, and generates said gain error signal to increase the gain in a case where said second count values are smaller than said predetermined value and also to decrease the gain in a case where said second count values are larger than said predetermined value and smaller than said first count value, and further said error detecting section generates a frequency error signal for controlling the characteristics of said loop filter based on a detected deviation of a bit clock count value relative to a proper value at the time the count value of any threshold level reaches said preset value.

11. The digital signal reproducing apparatus in accordance with claim 10, wherein said error detecting section does not produce said gain error signal when any one of said second count values reaches said preset value.

12. The digital signal reproducing apparatus in accordance with claim 10, wherein said cross detecting section has first and second threshold levels equivalent to upper and lower peak values of said reproduced signal at a minimum inversional transition and a third threshold level equivalent to a mid level between said first and second threshold levels, and said cross detecting section increments the count value for each of said first to third threshold levels in response to a change of said reproduced signal across said each of said first to third threshold levels.

* * * * *